US012754645B2

(12) United States Patent
He

(10) Patent No.: US 12,754,645 B2
(45) Date of Patent: Oct. 6, 2026

(54) DISPLAY PANEL

(71) Applicant: Hefei Visionox Technology Co., Ltd., Hefei (CN)

(72) Inventor: Kun He, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 19/411,533

(22) Filed: Dec. 8, 2025

(65) Prior Publication Data

US 2026/0093367 A1 Apr. 2, 2026

Related U.S. Application Data

(63) Continuation of application No. PCT/CN2025/122157, filed on Sep. 18, 2025.

(30) Foreign Application Priority Data

Aug. 14, 2025 (CN) ......................... 202511140933.5

(51) Int. Cl.
*G06F 3/044* (2006.01)

(52) U.S. Cl.
CPC .......... *G06F 3/0446* (2019.05); *G06F 3/0448* (2019.05); *G06F 2203/04112* (2013.01)

(58) Field of Classification Search
CPC .. G06F 30/0446; G06F 3/0412; G06F 3/0443; G06F 3/0448; G06F 2203/04112
See application file for complete search history.

(56) References Cited

U.S. PATENT DOCUMENTS

| | | | | |
|---|---|---|---|---|
| 10,234,971 | B2 * | 3/2019 | Ding | G06F 3/0412 |
| 2017/0131816 | A1 * | 5/2017 | Zou | G06F 3/0412 |
| 2022/0269363 | A1 * | 8/2022 | Li | G06F 3/0412 |

FOREIGN PATENT DOCUMENTS

| | | | |
|---|---|---|---|
| CN | 116974399 | A | 10/2023 |
| CN | 119907526 | A | 4/2025 |

* cited by examiner

*Primary Examiner* — Shaheda A Abdin
(74) *Attorney, Agent, or Firm* — Maier & Maier, PLLC

(57) ABSTRACT

A display panel, including: a base plate; a light-emitting layer; and a touch layer disposed at a side of the light-emitting layer away from the base plate and including a plurality of touch electrode blocks, two or more side-by-side first gaps of a line shape being formed between orthographic projections of a group of adjacent touch electrode blocks on the base plate, at least one second gap being formed within an orthographic projection of the touch electrode block located between, with respect to orthographic projections on the base plate, adjacent and side-by-side first gaps on the base plate, a distance between any point on the second gap and a correspondingly adjacent first gap being less than or equal to 200 μm, or a distance between any point on the second gap and an adjacent second gap being less than or equal to 200 μm.

19 Claims, 17 Drawing Sheets

DISPLAY PANEL

CROSS REFERENCE TO RELATED APPLICATION

The present application is a continuation application of International Application No. PCT/CN2025/122157, filed on Sep. 18, 2025, which claims priority to Chinese Patent Application No. 202511140933.5 filed on Aug. 14, 2025, both of which are incorporated herein by reference in their entireties.

TECHNICAL FIELD

The present application relates to the field of display technology, and particularly to a display panel.

BACKGROUND

Planar display panels based on Organic Light Emitting Diode (OLED) and Light Emitting Diode (LED), etc., are widely used in cell phones, TVs, notebook computers, desktop computers and other consumer electronic products due to their high image quality, power saving, thin body and wide range of applications, and have become the mainstream of the display apparatus.

The performance of the display panel is limited by the existing structure of the display panel.

Therefore, there is an urgent need for a new type of display panel.

SUMMARY

Embodiments of the present application provide a display panel in which the distance between the orthographic projection of a first light-emitting unit within a first light-emitting group on a base plate and the orthographic projection of an adjacent first wiring on the base plate is equal to the distance between the orthographic projection of a first light-emitting unit within a second light-emitting group on the base plate and the orthographic projection of an adjacent first wiring on the base plate, which avoids severe color deviation at wide viewing angles due to the distance between adjacent two first light-emitting units within the first light-emitting group being unequal to the distance between adjacent two first light-emitting units within the second light-emitting group, so that the light-blocking effects of the first wiring on the corresponding first light-emitting units within the first and second light-emitting groups are consistent, thereby increasing the uniformity of light-emitting of the first light-emitting units, improving the display effect of the display panel, and enhancing the performance of the display panel.

Embodiments of a first aspect of the present application provide a display panel, including: a base plate; a light-emitting layer disposed at one side of the base plate and including light-emitting units; and a touch layer disposed at a side of the light-emitting layer away from the base plate and including a plurality of touch electrode blocks, two or more side-by-side first gaps of a line shape being formed between orthographic projections of a group of adjacent touch electrode blocks on the base plate, at least one second gap being formed within an orthographic projection of the touch electrode block located between, with respect to orthographic projections on the base plate, adjacent and side-by-side first gaps on the base plate, a distance between any point on the second gap and a correspondingly adjacent first gap being less than or equal to 200 μm, and/or a distance between any point on the second gap and an adjacent second gap being less than or equal to 200 μm.

Embodiments of a second aspect of the present application provide a display panel, including: a base plate; a light-emitting layer disposed at one side of the base plate and including light-emitting units; and a touch layer disposed at a side of the light-emitting layer away from the base plate and including a plurality of touch electrode blocks, along a direction away from a plane in which the base plate is located, the touch layer including a first conductive layer, a first insulating layer, and a second conductive layer that are stacked, the touch electrode blocks including a plurality of first touch electrode blocks and a plurality of second touch electrode blocks, one of the first touch electrode block and the second touch electrode block being located in the first conductive layer, and the other being located in the second conductive layer, the plurality of first touch electrode blocks extending along a first direction and being spaced apart along a second direction, the plurality of second touch electrode blocks extending along the second direction and being spaced apart along the first direction, and the first direction intersecting the second direction; the first touch electrode block including a plurality of fifth sub-portions spaced apart along both the first direction and the second direction and connected through first connecting portions, and the second touch electrode block including a plurality of sixth sub-portions spaced apart along both the first direction and the second direction and connected through second connecting portions; second gaps being formed between orthographic projections of the fifth sub-portions on the base plate and orthographic projections of the sixth sub-portions on the base plate, first gaps being formed between orthographic projections of the first touch electrode blocks and the second touch electrode blocks on the base plate, a distance between any point on the second gap and an adjacent first gap being less than or equal to 200 μm, and/or a distance between any point on the second gap and an adjacent second gap being less than or equal to 200 μm.

Embodiments of a third aspect of the present application provide a display panel, including: a base plate; an isolation structure disposed at one side of the base plate and forming a plurality of isolation openings; a light-emitting layer disposed at one side of the base plate and including light-emitting units, at least a portion of the light-emitting unit being disposed within the isolation opening; and a touch layer disposed at a side of the light-emitting layer away from the base plate and including a plurality of touch electrode blocks that are spaced apart and electrically insulated along both a first direction and a second direction, the touch electrode block including a plurality of electrode strips, an orthographic projection of the electrode strip on the base plate at least partially overlapping an orthographic projection of the isolation structure on the base plate, first gaps being formed along both the first direction and the second direction between orthographic projections of adjacent touch electrode blocks on the base plate, and the first direction intersecting the second direction; one or more second gaps being formed along both the first direction and the second direction in an orthographic projection of the touch electrode block located between, with respect to orthographic projections on the base plate, adjacent and side-by-side first gaps on the base plate, a distance between any point on the second gap and an adjacent first gap being less than or equal to 200 μm, and/or a distance between any point on the second gap and an adjacent second gap being less than or equal to 200 μm.

Compared with the prior art, the embodiments of the present application additionally form the second gaps in the touch electrode block and limit the distance between any point on the second gap and an adjacent first gap to be less than or equal to 200 μm, and/or the distance between any point on the second gap and an adjacent second gap to be less than or equal to 200 μm, so that the distances between bright lines generated by the second gaps or the first gaps are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

DETAILED DESCRIPTION

Figure 1:
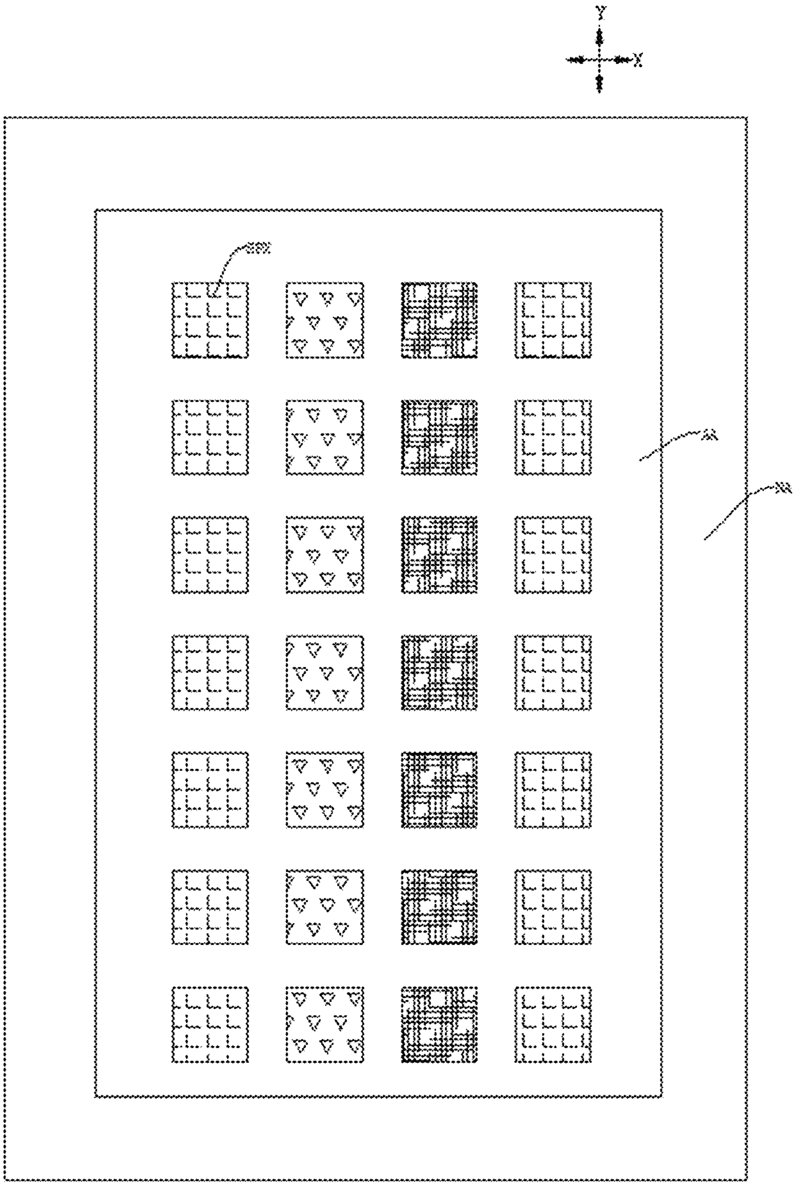
FIG. 1 shows a schematic structural diagram of a display panel according to an embodiment of the present application.

Features and exemplary embodiments of various aspects of the present application will be described in detail below. In the detailed description below, numerous specific details are presented to provide a comprehensive understanding of the present application. However, it will be apparent to those skilled in the art that the present application can be implemented without some of these specific details. The following description of the embodiments is intended merely to provide a better understanding of the present application by illustrating examples the present application. In the drawings and the following description, at least some of the well-known structures and techniques are not shown to avoid unnecessary obscurity of the present application; and for clarity, the dimensions of some structures may be exaggerated. Furthermore, the features, structures, or characteristics described herein can be combined in any suitable manner in one or more embodiments.

To clarify the objectives, technical solutions, and advantages of the embodiments of the present application, the technical solutions of the embodiments of the present application will be described clearly and completely below with reference to the accompanying drawings of the embodiments of the present application. It should be understood that the described embodiments are a part of the embodiments of the present application, not all embodiments. Generally, components of the embodiments of the present application described and illustrated in the drawings may be arranged and designed in various different configurations.

It should be noted that similar reference numerals and letters are used to indicate similar items in the following drawings. Therefore, once an item is defined in one drawing, it need not be further defined or explained in subsequent drawings. It should be understood that, where not conflicting, different features in the embodiments of the present application may be combined.

For ease of understanding, mutually orthogonal X, Y, and Z axes are depicted in the drawings. The direction along the X-axis is referred to as the X-direction, the direction along the Y-axis as the Y-direction, and the direction along the Z-axis as the Z-direction. The Z-direction is the normal direction relative to the plane containing the X-direction and the Y-direction. Furthermore, the view of various elements observed parallel to the plane containing the X-direction and the Y-direction is referred to as a top view. Or, the plane containing the X-direction and the Y-direction is a plane parallel to the display surface of the display panel, and the Z direction is a direction parallel to the thickness direction of the display panel.

For certain elements, terms such as “up” and “above” may be used to describe the position of the element along the Z direction, while terms such “down” and “under” may be used to describe the position of the element along the opposite direction. Furthermore, when terms such as “up”, “above”, “down”, “under”, and “relative” are used to define the positional relationship between two elements, this encompasses not only the case where the two elements are directly adjacent, but also the case where the two elements are separated by a gap or other elements. Additionally, terms such as “first,” “second,” and “third” are used merely for distinguishing items, and should not be interpreted as indicating or implying relative importance.

FIG. 1 shows a schematic structural diagram of a display panel according to an embodiment of the present application. The display panel may be an organic light-emitting diode (OLED) display panel or a quantum dot light-emitting diode (QLED) display panel, and includes a display area AA with a display function and a non-display area NA.

The shape of the display area AA of the display panel may be a rectangle, a square, a circle, an ellipse, or other shapes.

The display area AA includes a plurality of pixels PX arranged in both the X and Y directions. The pixels PX include a plurality of sub-pixels SPX that display different colors. In some embodiments, the pixels PX include first sub-pixels SPX1, second sub-pixels SPX2, and third sub-pixels SPX3. For example, the first sub-pixels SPX1 are blue sub-pixels, the second sub-pixels SPX2 are green sub-pixels, and the third sub-pixels SPX3 are red sub-pixels. In some embodiments, the pixels PX further include, in addition to the sub-pixels SPX1, SPX2, and SPX3, sub-pixels SPX that emit white or other colored lights.

The sub-pixel SPX includes a pixel drive circuit and a light-emitting device driven by the pixel drive circuit to emit light of a corresponding color. The first sub-pixel SPX1 includes a first light-emitting device, the second sub-pixel SPX2 includes a second light-emitting device, and the third sub-pixel SPX3 includes a third light-emitting device. One pixel drive circuit drives at least one light-emitting device to emit light. For example, the display area AA includes a normal display area and a light-transmitting display area, in which the light-transmitting display area is arranged correspondingly to sensors and has light-transmitting properties, and the normal display area is arranged not correspondingly to sensors. In the normal display area, one pixel drive circuit drives one light-emitting device to emit light, and in the light-transmitting display area, one pixel drive circuit drives one or more light-emitting devices to emit light.

In the prior art, in a display panel including an isolation structure, the encapsulation layer is generally thick and the distances between light-emitting units are small. With the isolation structure, the corresponding pixel openings are formed by photolithography, the pixel-to-pixel opening distance (PDL gap) may be significantly reduced compared with the conventional FMM evaporation method, thereby increasing opening ratio. However, due to the small pixel-to-pixel opening distance, the distance between an electrode strip in a touch electrode block and the pixel opening is compressed, and the electrode strip in the touch electrode block is close to a light-emitting layer, in which case lights will not be blocked when viewed vertically, but at wide viewing angles, the lights emitted from the light-emitting units will be reflected at the bottom surface or side surface of the touch electrode block towards the light-emitting units, and thus the touch electrode block may block a portion of the lights emitted from the light-emitting units. First gaps are formed between the orthographic projections of adjacent touch electrode blocks on the base plate, areas corresponding to the first gaps are brighter, while areas without the first gap are darker, while in the prior art, the density of the first gaps is low, the spacing between the first gaps is large, and the display panel including the isolation structure is typically not provided with a light-blocking layer such as black matrices to block lights, and thus the difference in light-blocking effects of the first gaps and adjacent areas and the low density of the first gaps may be recognized by human eyes at viewing angles, which causes bright lines and degrades user experience.

To address the above issues, the embodiments of the present application additionally form the second gaps in the touch electrode block and limit the distance between any point on the second gap and an adjacent first gap to be less than or equal to 200 μm, and/or the distance between any point on the second gap and an adjacent second gap to be less than or equal to 200 μm, so that the distances between bright lines generated by the second gaps or the first gaps are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

The embodiments of the present application provide a display panel and a display apparatus, which will be described below with reference to FIGS. 1 to 29.

Figure 2:
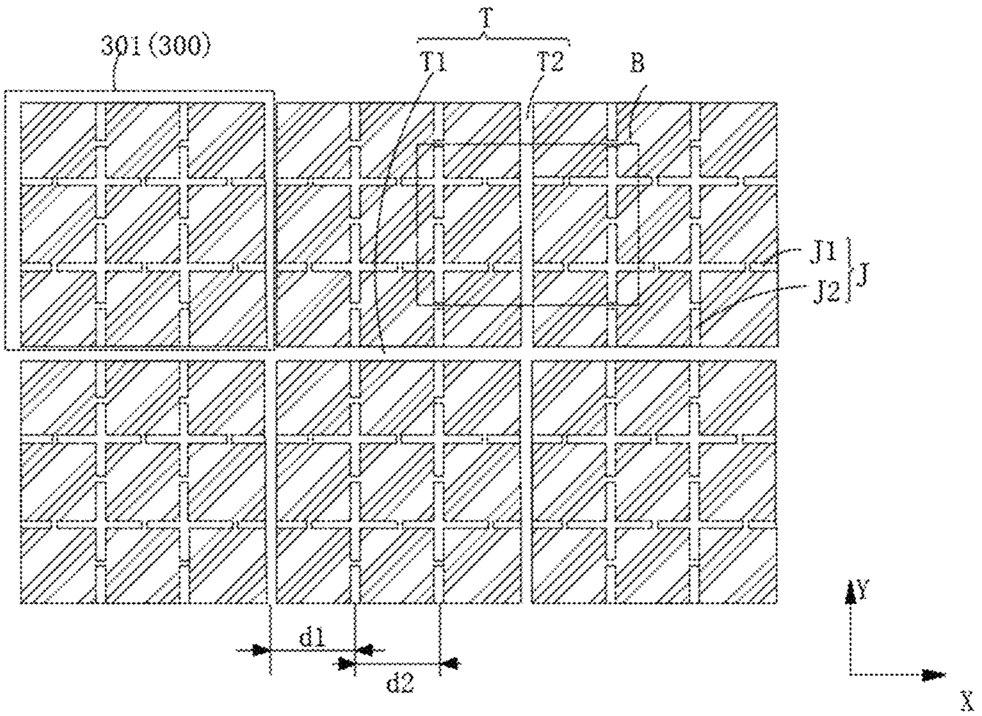
FIG. 2 shows a schematic structural diagram of a touch layer in a display panel according to an embodiment of the present application.
Figure 3:
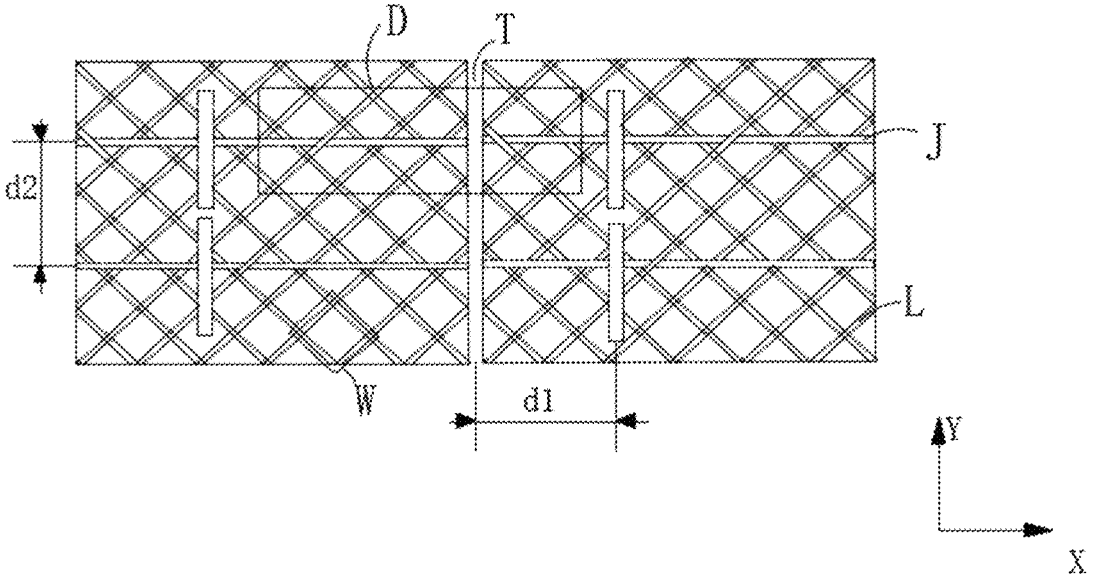
FIG. 3 shows a partial enlarged view of area B in FIG. 2 according to an embodiment of the present application.
Figure 4:
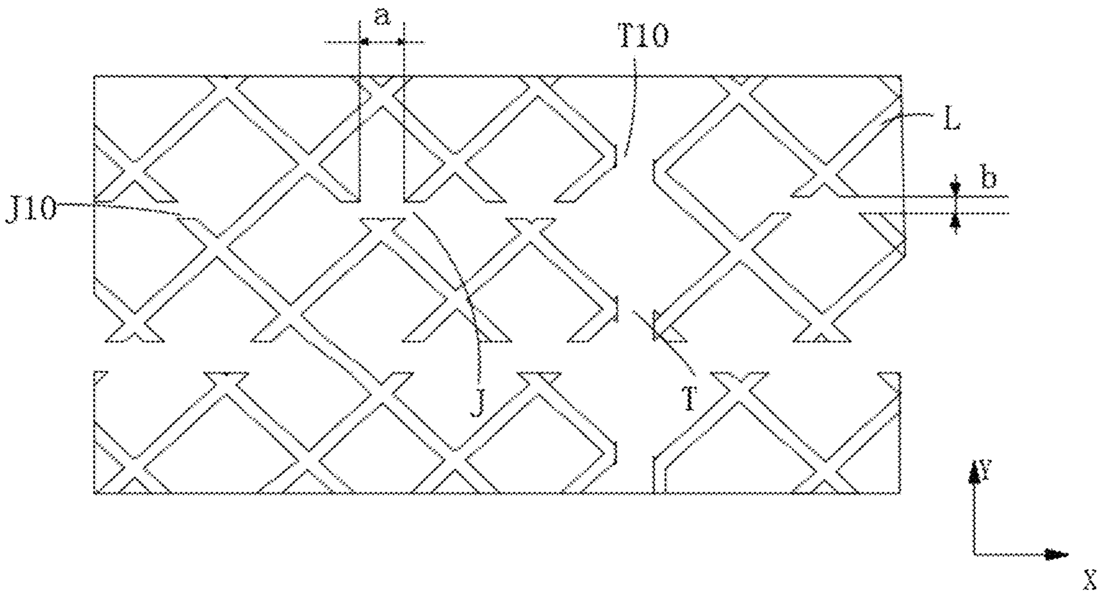
FIG. 4 shows a partial enlarged view of area D in FIG. 3 according to an embodiment of the present application.
Figure 5:
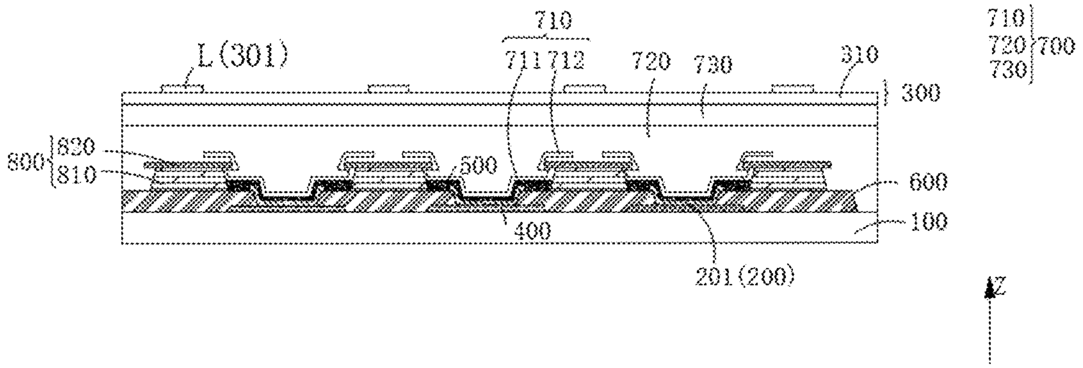
FIG. 5 shows a film layer structural diagram of a display panel according to an embodiment of the present application.

Referring to FIGS. 1 to 5, in which FIG. 1 shows a schematic structural diagram of a display panel according to an embodiment of the present application, FIG. 2 shows a schematic structural diagram of a touch layer in a display panel according to an embodiment of the present application, FIG. 3 shows a partial enlarged view of area B in FIG. 2 according to an embodiment of the present application, FIG. 4 shows a partial enlarged view of area D in FIG. 3 according to an embodiment of the present application, and FIG. 5 shows a film layer structural diagram of a display panel according to an embodiment of the present application.

The embodiments of the present application provide a display panel, including: a base plate 100; a light-emitting layer 200 disposed at one side of the base plate 100 and including light-emitting units; and a touch layer 300 disposed at a side of the light-emitting layer 200 away from the base plate 100 and including a plurality of touch electrode blocks 301, two or more side-by-side first gaps T of a line shape being formed between orthographic projections of a group of adjacent touch electrode blocks 301 on the base plate 100, at least one second gap J being formed in an orthographic projection of the touch electrode block 301 located between, with respect to orthographic projections on the base plate 100, adjacent and side-by-side first gaps T on the base plate 100, a distance d1 between any point on the second gap J and a correspondingly adjacent first gap T being less than or equal to 200 μm, and/or a distance d2 between any point on the second gap J and an adjacent second gap J being less than or equal to 200 μm.

The display panel according to the embodiments of the present application includes the base plate 100, the light-emitting layer 200, and the touch layer 300, the first gaps T of a line shape are formed between the orthographic projections of adjacent touch electrode blocks 301 on the base plate 100, which electrically insulate the adjacent touch electrode blocks 301 when they are in the same layer, and at least one second gap J is formed in the orthographic projection of the touch electrode block 301 located between, with respect to orthographic projections on the base plate 100, adjacent and side-by-side first gaps T on the base plate 100, and thus the lights emitted from the light-emitting units can be transmitted through the first gaps T and the second gaps J. The embodiments of the present application limit the distance d1 between any point on the second gap J and an adjacent first gap T to be less than or equal to 200 μm, and/or the distance d2 between any point on the second gap J and an adjacent second gap J to be less than or equal to 200 μm, so as to increase the overall arrangement density of the second gaps J and the first gaps T. The inventors have found that, due to the recognition limitation of human eyes, under a condition that the distance d1 between any point on the second gap J and a correspondingly adjacent first gap T is less than or equal to 200 μm, and/or the distance d2 between any point on the second gap J and an adjacent second gap J is less than or equal to 200 μm, the distances between the line-shaped lights generated by the second gaps J or the first gaps T are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

It should be noted that the plurality of touch electrode blocks 301 in the touch layer 300 may refer to touch electrode blocks 301 located in a same layer, or touch electrode blocks 301 located in different layers. If the touch electrode blocks 301 are located in a same layer, the first gap T is the spacing between adjacent touch electrode blocks 301, and if the touch electrode blocks 301 are located in different layers, the first gap T is the spacing between the orthogonal projections of adjacent touch electrode blocks 301 on the base plate 100.

A group of adjacent touch electrode blocks 301 may refer to only one pair of adjacent electrode blocks 301 or a plurality of pairs of adjacent touch electrode blocks 301, in which a plurality of pairs of adjacent touch electrode blocks 301 may refer to a pair of multiple groups of adjacent touch electrode blocks 301 or a plurality of pairs of multiple groups of adjacent touch electrode blocks 301.

The second gaps J may be formed by etching through the touch electrode block 301 and formed within the touch electrode block 301, and the number and position of the second gaps J should be determined according to the position and extension direction of the first gaps T. It can be understood that, the more the second gaps J, the smaller the distance d1 between any point on the second gap J and an adjacent first gap T and the distance d2 between any point on the second gap J and an adjacent second gap J. However, an excessive number of second gaps J may degrade the touch performance of the touch electrode block 301, and thus the number of the second gaps J is sufficient if the distance d1 between any point on the second gap J and an adjacent first gap T is less than or equal to 200 μm, and/or the distance d2 between any point on the second gap J and an adjacent second gap J is less than or equal to 200 μm.

In the embodiment, the adjacent and side-by-side first gaps T may refer to two first gaps T with parallel extension directions, or two first gaps T with non-parallel extension directions but forming a small angle between them, for example, the angle between the extension directions of two first gaps T that are adjacent and side-by-side is less than or equal to 5°. The adjacent and side-by-side first gaps T may have the same or different lengths.

The distance d1 between any point on the second gap J and an adjacent first gap T being less than or equal to 200 μm means that the distance between any one of the points on the second gap J and an adjacent first gap T is less than or equal to 200 μm. For example, the distance d1 between any point on the second gap J and an adjacent first gap T may be any of 100 μm, 110 μm, 120 μm, 130 μm, 140 μm, 150 μm, 160 μm, 170 μm, 180 μm, 190 μm, and 200 μm. Similarly, the distance d2 between any point on the second gap J and an adjacent second gap J being less than or equal to 200 μm means that the distance between any one of the points on one second gap J and an adjacent second gap J is less than or equal to 200 μm. For example, the distance d2 between any point on the second gap J and an adjacent second gap J may be any one of 100 μm, 110 μm, 120 μm, 130 μm, 140 μm, 150 μm, 160 μm, 170 μm, 180 μm, 190 μm, and 200 μm.

It may be understood that, in the embodiment, it may be defined that only the distance d1 between any point on the second gap J and an adjacent first gap T is less than or equal to 200 μm, or only the distance d2 between any point on the second gap J and an adjacent second gap J is less than or equal to 200 μm, or both the distance d1 between any point on the second gap J and an adjacent first gap T and the distance d2 between any point on the second gap J and an adjacent second gap J are less than or equal to 200 μm, so as to ensure that the arrangement density of the first gaps T and the second gaps J is sufficiently high to prevent human eyes from recognizing bright lines.

In some optional embodiments, an extension direction of the second gap J is consistent with an extension direction of an adjacent first gap T.

It should be noted that the extension directions being consistent may mean that the extension direction of the second gap J is parallel to the extension direction of the adjacent first gap T, or that the angle between the two extension directions is small. For example, the angle between the extension directions of the second gap J and the adjacent first gap T is less than or equal to 5°.

It may be understood that if the difference between the extension directions of the second gap J and the adjacent first gap T is too great, the possibility of human eyes recognizing bright lines may be increased. Therefore, it is necessary to ensure that the difference between the extension directions of the second gap J and the adjacent first gap T is small.

Referring to FIGS. 3 to 4, in some optional embodiments, the touch electrode block 301 includes a mesh structure consisting of a plurality of electrode strips L, within the touch electrode block 301, orthographic projections of end-points of a portion of the electrode strips L on the base plate 100 are spaced apart to form the first dot-shaped gaps J10, and a plurality of first dot-shaped gaps J10 are spaced apart to form the second gap J.

In the embodiment, the electrode strip L may be broken by processes such as etching to remove a part of the electrode strip L and form the first dot-shaped gap J10, and the endpoint of the electrode strip L corresponds to the broken point. Since the part of the electrode strip L corresponding to the first dot-shaped gap J10 is removed and light can be transmitted through this part, a plurality of first dot-shaped gaps J10 are spaced apart to form the second gap J, at which light is transmitted. The second gaps J are formed by removing the parts of the electrode strips L.

Optionally, a distance a between adjacent first dot-shaped gaps J10 on a same second gap J is less than or equal to 50 μm. It may be understood that the distance a between adjacent first dot-shaped gaps J10 on a same second gap J should not be excessively large, otherwise it may be difficult to emit continuous lights, i.e., line-shaped lights. Optionally, according to actual process requirements, the distance a between adjacent first dot-shaped gaps J10 on a same second gap J may be any of 20 μm, 30 μm, 40 μm, and 50 μm.

Optionally, a distance b between the spaced apart endpoints of the electrode strip L is less than or equal to 20 μm. It may understood that the greater the distance b between the spaced apart endpoints of the electrode strip L, the greater part of the electrode strip L being removed, resulting in a larger light-transmitting area. However, an excessively large light-transmitting area may cause noticeable bright lines or spots, and thus the distance b between the spaced apart endpoints of the electrode strip L should not be excessively large. For example, the distance b between the spaced apart endpoints of the electrode strip L may be any of 10 μm, 12 μm, 14 μm, 16 μm, 18 μm, and 20 μm.

Optionally, the electrode strips L form a plurality of mesh units W, and a shape of an orthographic projection of the mesh unit W on the base plate 100 matches a shape of an orthographic projection of the light-emitting unit on the base plate 100, that is, the shape formed by the edges of the orthographic projection of the mesh unit W on the base plate 100 may be similar to the shape of the orthographic projection of the light-emitting unit on the base plate 100. For example, if the orthographic projection of the light-emitting unit on the base plate 100 is rectangular, the orthographic projection of the mesh unit W on the base plate 100 may also be rectangular. Alternatively, if the orthographic projection of the light-emitting unit on the base plate 100 is rhombic, the orthographic projection of the mesh unit W on the base plate 100 may also be rhombic. The shape formed by the edges of the orthographic projection of the mesh unit W on the base plate 100 may be specifically configured according to the shape of the orthographic projection of the light-emitting unit on the base plate 100.

Refer to FIGS. 3 to 4, in some optional embodiments, one of the second gaps J intersects one or more of the electrode strips L, that is, a single second gap J will not break all electrode strips L. The electrode strips L located at two sides of the second gap J should be electrically connected to facilitate unified signal transmission.

Alternatively, it may be understood that a connecting line between adjacent dot-shaped gaps traverses at least one electrode strip L which is continuously arranged, that is, electrode strips L which are not broken are located between some adjacent dot-shaped gaps and used to electrically connect the electrode strips L located at two sides of the second gap J.

Referring to FIGS. 2 to 4, in some optional embodiments, the first dot-shaped gap J10 on one second gap J is staggered relative to the first dot-shaped gap J10 on an adjacent second gap J; the first gaps T include a third sub-gap T1 extending along the first direction X and a fourth sub-gap T2 extending along the second direction Y, the second gaps J include a first sub-gap J1 corresponding to the third sub-gap T1 and a second sub-gap J2 corresponding to the fourth sub-gap T2, and the first direction X intersects the second direction Y.

In the embodiment, the first dot-shaped gap J10 on one second gap J is staggered relative to the first dot-shaped gap J10 on an adjacent second gap J, that is, a plurality of electrode strips L may be disposed between the first dot-shaped gap J10 on one second gap J and the first dot-shaped gap J10 on an adjacent second gap J to separate the various second gaps J. The second gaps J including the first sub-gap J1 corresponding to the third sub-gap T1 and the second sub-gap J2 corresponding to the fourth sub-gap T2 means that the first sub-gap J1 may be disposed between adjacent and side-by-side third sub-gaps T1, and the second sub-gap J2 may be disposed between adjacent and side-by-side fourth sub-gaps T2.

Optionally, the extension direction of the first sub-gap J1 is consistent with the extension direction of the third sub-gap T1, and the extension direction of the second sub-gap J2 is consistent with the extension direction of the fourth sub-gap T2. The first sub-gap J1 may be parallel to the extension direction of the third sub-gap T1 or form a certain angle with the extension direction of the third sub-gap T1. For example, the angle between the first sub-gap J1 and the extension direction of the third sub-gap T1 may be less than or equal to 5°. Similarly, the second sub-gap J2 may be parallel to the extension direction of the fourth sub-gap T2 or form a certain angle with the extension direction of the fourth sub-gap T2. For example, the angle between the second sub-gap J2 and the extension direction of the fourth sub-gap T2 may be less than or equal to 5°.

The extension direction of the first sub-gap J1 refers to the overall extension direction of a segment of the first sub-gap J1, not the extension direction at any specific point on the first sub-gap J1. For example, if the extension trajectory of the first sub-gap J1 is a straight line, the extension direction is the extension direction of the straight line; or if the extension trajectory of the first sub-gap J1 is a curved line, such as a wavy line, the extension direction of the first sub-gap J1 is the overall direction of the wavy line, not the direction at any specific point or the tangential direction at any point along the curved line.

Referring to FIG. 4, in some optional embodiments, each of the touch electrode blocks 301 includes a mesh structure consisting of a plurality of electrode strips L, orthographic projections of endpoints of a portion of the electrode strips L between adjacent touch electrode blocks 301 on the base plate 100 are spaced apart to form second dot-shaped gaps T10, and adjacent second dot-shaped gaps T10 are arranged to form the first gap T.

In an embodiment, the arrangement density of the first dot-shaped gaps J10 on the second gap J is no less than 50% of the arrangement density of the second dot-shaped gaps T10 on an adjacent first gap T. In this way, a better display effect can be achieved.

The arrangement density of the first dot-shaped gaps J10 on the second gap J is no less than 75% of the arrangement density of the second dot-shaped gaps T10 on an adjacent first gap T. In this way, a better display effect can be achieved.

It may be understood that in the embodiment, the first gap T is formed between a portion of the electrode strips L between adjacent touch electrode blocks 301, and since the touch electrode blocks 301 generally should be electrically insulated, the first gap T does not intersect the electrode strip L, that is, adjacent touch electrode blocks 301 will not be electrically connected through the electrode strips L.

It should be noted that the first gap T and the second gap J may be gaps formed between side-by-side electrode strips L, rather than the above gaps formed by the dot-shaped gaps.

It should be noted that the specific forms of the first gap T and the second gap J in the following embodiments are the same as the structural forms of the second gap J formed by the first dot-shaped gaps J10 on the electrode strip L and the first gap T formed by the second dot-shaped gaps T10 on the electrode strip L as shown in FIG. 4, except the extension direction.

Figure 7:
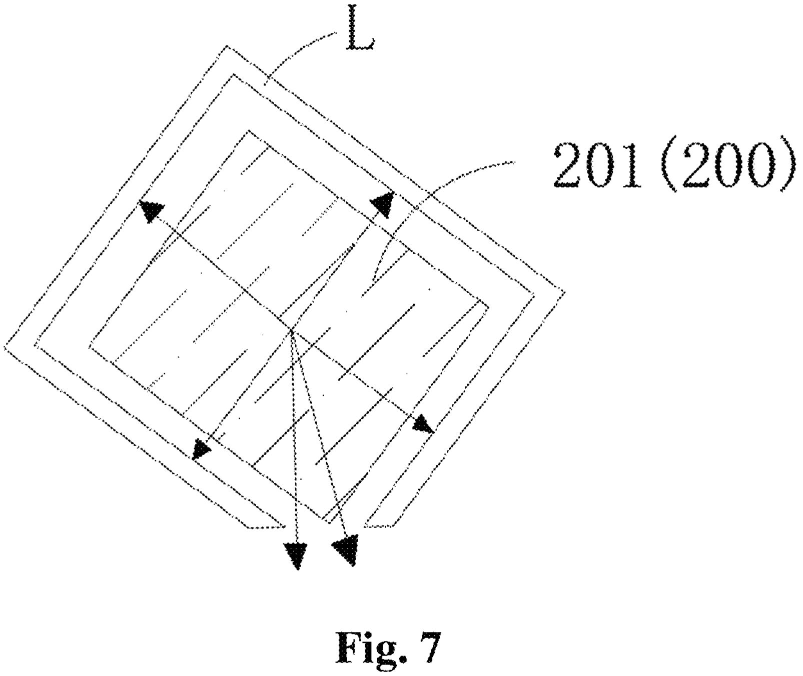
FIG. 7 shows schematic position diagram of an electrode strip and a light-emitting unit according to an embodiment of the present application.

Referring to FIG. 7, in some optional embodiments, the orthographic projection of the electrode strip L on the base plate 100 at least partially surrounds the orthographic projection of the light-emitting unit 201 on the base plate 100.

It may be understood that since the electrode strip L is typically made of materials such as metal, with certain light-blocking properties, the electrode strip L should not directly shield the light-emitting unit and should be disposed according to the outer periphery of the light-emitting unit. As described above, the orthographic projection of the electrode strip L on the base plate 100 at least partially surrounds the orthographic projection of the light-emitting unit on the base plate 100, which ensures the light-emitting effect of the light-emitting units.

Figure 6:
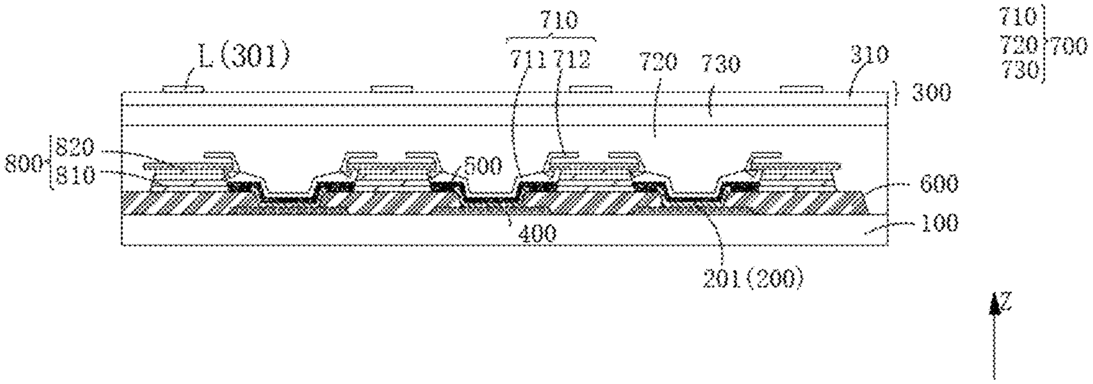
FIG. 6 shows a film layer structural diagram of a display panel according to another embodiment of the present application.

Referring to FIGS. 5 to 6, in some optional embodiments, the display panel further includes an isolation structure 800 disposed at one side of the base plate 100 and forming a plurality of isolation openings, and at least a portion of the light-emitting unit is disposed within the isolation opening; and the orthographic projection of the electrode strip L on the base plate 100 at least partially overlaps the orthographic projection of the isolation structure 800 on the base plate 100.

It should be noted that to avoid shielding the light-emitting unit, the electrode strip L may be disposed above the isolation structure 800, that is, the orthographic projection of the electrode strip L on the base plate 100 at least partially overlaps the orthographic projection of the isolation structure 800 on the base plate 100, which ensures the light-emitting effect of the light-emitting unit.

In these optional embodiments, the isolation structure 800 includes a first sub-layer 810 and a second sub-layer 820 stacked in a direction away from the base plate 100. The second sub-layer 820 protrudes towards the isolation opening relative to the first sub-layer 810, thereby forming a recess under the second sub-layer 820. During the fabrication of the light-emitting units, the light-emitting material may be fractured at the edges of the second sub-layer 820 to form independent light-emitting units.

In the embodiment, the light-transmitting opening may extend through the first sub-layer 810 and the second sub-layer 820 to prevent the first sub-layer 810 and the second sub-layer 820 from blocking light, in which the light may refer to light emitted from optical components under the display panel, such as cameras or infrared light-emitting elements, or light originating from external sources.

Optionally, the isolation structure 800 further includes a third sub-layer located at the side of the first sub-layer 810 towards the base plate 100 and protruding towards the isolation opening relative to the first sub-layer 810. During the fabrication of the isolation structure 800, the third sub-layer may protect the film layers located at the side corresponding to the base plate 100 when the first sub-layer 810 undergoes side etching.

Optionally, the first sub-layer 810 and the second sub-layer 820 are made of different materials, and the etch rate of the first sub-layer 810 is less than the etch rate of the second sub-layer 820. The material of the first sub-layer 810 includes conductive materials and may specifically include at least one of aluminum (Al) and an aluminum alloy, in which the aluminum alloy may include at least one of aluminum-neodymium alloy (AlNd), aluminum-yttrium alloy (AlY), and aluminum-silicon alloy (AlSi). The second sub-layer 820 may have a single-layer structure or a multi-layer structure, and if the second sub-layer 820 has a single-layer structure, the material of the second sub-layer 820 may include at least one of titanium, titanium nitride, molybdenum, tungsten, molybdenum-tungsten alloy, and molybdenum-niobium alloy. If the second sub-layer 820 has a multi-layer structure, the material of one layer of the second sub-layer 820 includes at least one of titanium, titanium nitride, molybdenum, tungsten, molybdenum-tungsten alloy, and molybdenum-niobium alloy, and the material of another layer of the second sub-layer 820 may include a conductive oxide, such as indium tin oxide (ITO) or indium zinc oxide (IZO), or an inorganic insulating material.

Optionally, the material of the third sub-layer includes conductive materials. For example, the material of the third sub-layer may include at least one of molybdenum (Mo), titanium (Ti), titanium nitride (TiN), molybdenum-tungsten alloy (MoW), and molybdenum-niobium alloy (MoNb).

In some embodiments of the present application, the base plate 100 further includes a substrate and a pixel drive circuit. For example, the base plate 100 includes a substrate and a drive circuit layer and a planarization layer disposed on the substrate. The pixel drive circuit includes a transistor and a capacitor C, in which the capacitor C includes a first plate C1 and a second plate C2, and the transistor includes a source S, a drain D, a gate G, and a semiconductor layer. The drive circuit layer further includes a plurality of signal lines, such as data signal lines, scanning signal lines, and drive power supply voltage signal lines. The drive circuit layer includes a plurality of conductive layers including a first metal layer, a second metal layer, and a third metal layer. The gate G and the first plate C1 may be in the first metal layer, the second plate C2 may be in the second metal layer, and the source S and the drain D may be in the third metal layer.

Figure 8:
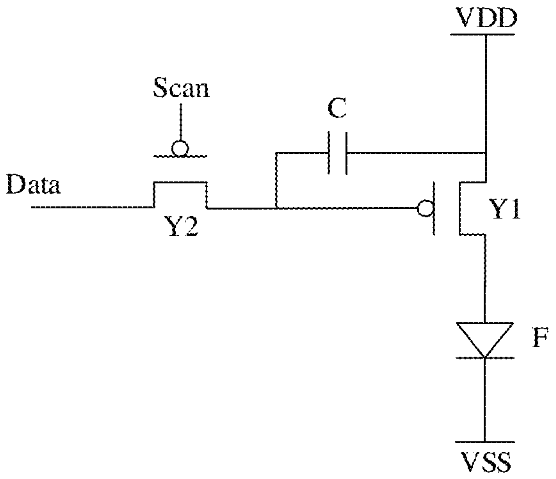
FIG. 8 shows a schematic circuit diagram of a pixel circuit according to an embodiment of the present application.

Optionally, referring to FIG. 8, the pixel drive circuit includes a drive transistor Y1 and a data transistor Y2, in which the source S of the data transistor Y2 is connected to the data line providing the data signal Data, the gate of the data transistor Y2 is connected to the scan line providing the scan signal Scan, the drain of data transistor Y2 is connected to the gate of the drive transistor Y1, two ends of the capacitor C are connected to the gate and source of the drive transistor Y1, respectively, and the drain of the drive transistor Y1 is connected to a light-emitting device F. FIG. 8 illustrates an embodiment of the pixel drive circuit, while the pixel drive circuit of the present application is not limited to the 2T1C pixel drive circuit as shown in FIG. 8 and may be other pixel drive circuits, such as 7T1C or 8T1C pixel drive circuits.

Optionally, the display panel may further include a pixel defining layer 600 located at one side of the base plate 100 and may include pixel defining portions and pixel openings formed by the pixel defining portions. The light-emitting layer 200 may be partially located within the pixel openings. The pixel defining layer 600 may be configured to partition the sub-pixels of the display panel.

In an embodiment, the pixel defining layer 600 includes a plurality of sub-layers, for example, the pixel defining layer 600 includes a first defining layer and a second defining layer that are stacked in sequence along the direction away from the base plate 100, that is, the pixel defining layer 600 may have a dual-layer design.

Exemplarily, the first defining layer has better film-forming property than the second defining layer. With equivalent thickness, the first defining layer can better cover the step structures formed by the first electrodes without cracking than the second defining layer. In other words, to achieve equivalent step coverage, the first defining layer requires a smaller thickness than the second defining layer, i.e., the thickness requirement for the first defining layer is less, which facilitates product thinning. Furthermore, the better film-forming property means better coverage and greater density for the formed films, thereby better isolating moisture. That is, the material density of the first defining layer is greater than the material density of the second defining layer.

Exemplarily, the second defining layer has better etch resistance than the first defining layer. Since the side of the pixel defining layer 600 away from the base plate 100 will be etched during fabrication of the display panel, selecting a material with better etch resistance for the second defining layer can improve the etch resistance of the pixel defining layer 600, thereby further increasing the reliability of the display panel.

Exemplarily, the first and second defining layers are made of different materials. For example, the material of the first defining layer includes silicon nitride, and the material of the second defining layer includes silicon oxide.

Exemplarily, the thickness of the first defining layer is greater than or equal to 1000 Å and less than or equal to 5000 Å, for example, 1000 Å, 2000 Å, 3000 Å, 4000 Å, 5000 Å, and the like.

Exemplarily, the thickness of the second defining layer is greater than or equal to 500 Å and less than or equal to 3000 Å, for example, 500 Å, 1000 Å, 2000 Å, 3000 Å, and the like.

Optionally, the material of the pixel defining layer 600 is an inorganic material. For example, the pixel defining layer 600 is made of an inorganic insulating material such as silicon nitride (SiNx), silicon oxide (SiOx), and silicon nitride oxide (SiON).

Optionally, the light-emitting unit may include a hole injection layer (HIL), a hole transport layer (HTL), a light-emitting structure, an electron injection layer (EIL), and an electron transport layer (ETL) that are stacked.

Referring to FIGS. 5 to 6, optionally, the display panel further includes a second electrode layer 400 disposed at the side of the light-emitting layer 200 towards the base plate 100, and a first electrode layer 500 located at the side of the light-emitting layer 200 away from the base plate 100100.

In these optional embodiments, the first electrode layer 500 and the second electrode layer 400 may be used as pixel electrode layers of the display panel, in which one of the first electrode layer 500 and the second electrode layer 400 may be used as an anode layer, and the other one may be used as a cathode layer, so as to drive the light-emitting layer 200 to emit light. In the embodiments of the present application, exemplarily, the second electrode layer 400 is the anode layer of the display panel, and the first electrode layer 500 is the cathode layer of the display panel.

To enable the light-emitting unit to emit light, a pixel voltage is provided to the second electrode layer 400 and a common voltage is provided to the first electrode layer 500, and thus a potential difference is formed between the first electrode layer 500 and the second electrode layer 400, causing the light-emitting unit disposed between the first electrode layer 500 and the second electrode layer 400 to emit light. In an embodiment, under a condition that a potential difference is formed between the first electrode and the second electrode, the corresponding light-emitting functional layer EML emits light.

The pixel voltage for the second electrode layer 400 is provided by the pixel drive circuit, and the common voltage for the first electrode layer 500 is provided by the isolation structure 800. Specifically, the first electrode layer 500 is electrically connected with the isolation structure 800, and the common voltage is provided to the isolation structure 800 so as to be further provided to the first electrode layer 500. That is, the isolation structure 800 serves to provide the common voltage to the first electrode layer 500.

The material of the first electrode layer 500 may be one of metallic materials such as silver (Ag), aluminum (Al), lithium (Li), magnesium (Mg), ytterbium (Yb), calcium (Ca), or indium (In), or an alloy thereof, such as magnesium-silver alloy (Mg/Ag) or lithium-aluminum alloy (Li/Al), which is not limited in the embodiment.

The second electrode layer 400 may include a multi-layer structure including, for example, a reflective layer and a pair of conductive oxide layers covering the upper and lower surfaces of the reflective layer, respectively. The reflective layer may be made of a metal material with excellent reflectivity, such as silver. Each of the conductive oxide layers may be made of transparent conductive oxides such as Indium Tin Oxide (ITO), Indium Zinc Oxide (IZO), or Indium Gallium Zinc Oxide (IGZO).

Optionally, the display panel further includes an encapsulation layer 700 including a first encapsulation layer 710. The first encapsulation layer 710 includes a plurality of encapsulation portions located on the side of the second electrode away from the base plate 100 and extending through the side walls of the isolation structure 800 to the side of the isolation structure 800 away from the base plate 100.

Referring to FIG. 6, exemplarily, the encapsulation portion includes a first segment 711 and a second segment 712 that are connected, in which the first segment 711 is located within the isolation opening K and disposed at the side of the light-emitting unit away from base plate 100, the second segment 712 is located at the side of the isolation structure 800 towards the isolation opening K, and the surface of the first segment 711 away from the base plate 100 and the surface of the second segment 712 away from the isolation structure 800 are at least partially connected form a gap space.

Referring to FIG. 5, exemplarily, the surface of the first segment 711 away from the base plate 100 may be not connected with the surface of the second segment 712 away from the isolation structure 800.

The display panel further includes a second encapsulation layer 720 covering the isolation structure 800 and the encapsulation portions and a third encapsulation layer 730 covering the second encapsulation layer 720. Both the first encapsulation layer 710 and the third encapsulation layer 730 are made of inorganic materials, including at least one of silicon nitride (SiN), silicon oxide (SiO), and silicon oxynitride (SiON). The second encapsulation layer 720 is made of organic insulating materials, such as resin materials like epoxy resin or acrylic resin. The second encapsulation layer 720 and the third encapsulation layer 730 are disposed continuously at least in the display area AA, with a portion disposed in the non-display area NA.

The material of the second encapsulation layer 720 includes organic materials, which may be made of resins or polymeric organic materials, specifically using an inkjet printing (IJP) process. Inkjet printing is a non-contact micron-level printing process which may directly spray nano-sized solution onto flexible or rigid base plates. Specifically, inkjet printing involves dissolving organic encapsulation materials into a solvent to form a solution, and then spraying the solution in extremely small volume (picoliter level) through a printhead, thereby precisely printing small ink droplets onto a target film layer, which is dried to form a film layer of the device.

Optionally, the material of the first encapsulation layer 710 may be the same as the material of the third encapsulation layer 730, so that the first encapsulation layer 710 and the third encapsulation layer 730 can be manufactured using the same equipment, which can simplify the fabrication process of the display panel. The display panel may further include at least one of a touch layer 300, a polarizer, a colored film base plate 100, and a protective cover plate, which may be adhered to the display panel through an adhesive layer such as optical clear adhesive (OCA).

In some optional embodiments, at least a portion of the touch electrode blocks 301 are located in different layers, and correspondingly, the first gap T is formed between the orthographic projections of the touch electrode blocks 301 located in different layers on the base plate 100.

Figure 9:
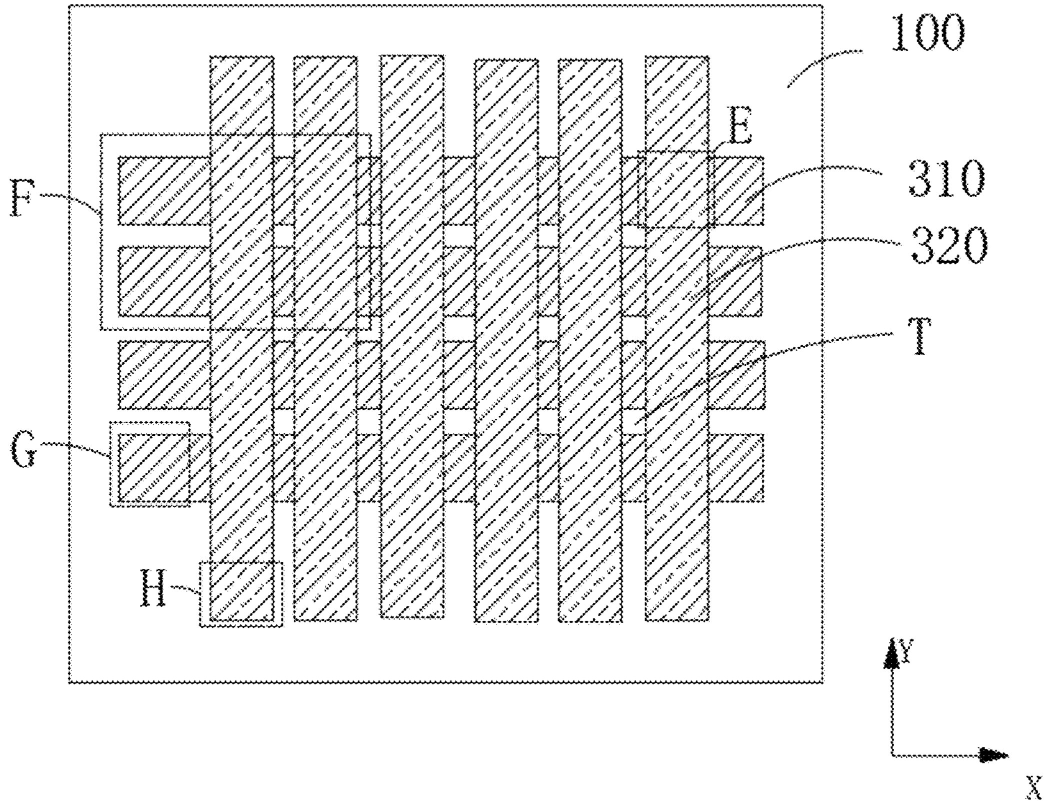
FIG. 9 shows a schematic structural diagram of a touch layer in a display panel according to another embodiment of the present application.
Figure 18:
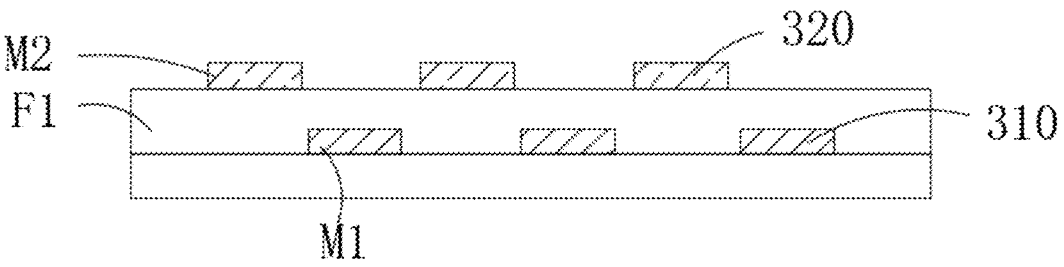
FIG. 18 shows a schematic structural diagram of a touch layer according to an embodiment of the present application.

Referring to FIGS. 9 and 18, optionally, along a direction away from a plane in which the base plate 100 is located, the touch layer 300 includes a first conductive layer M1, a first insulating layer F1, and a second conductive layer M2 that are stacked; the touch electrode blocks 301 include a plurality of first touch electrode blocks 310 and a plurality of second touch electrode blocks 320, one of the first touch electrode block 310 and the second touch electrode block 320 is located in the first conductive layer M1, and the other is located in the second conductive layer M2; the plurality of first touch electrode blocks 310 extend along a first direction X and are spaced apart along a second direction Y, the plurality of second touch electrode blocks 320 extend along the second direction Y and are spaced apart along the first direction X, and the first direction Y intersects the second direction X; and the first gaps T are formed between orthographic projections of the first touch electrode blocks 310 on the base plate 100 and orthographic projections of the second touch electrode blocks 320 on the base plate 100.

It should be noted that in the embodiment, the touch layer 300 has a mutual-capacitive touch structure, in which one of the first touch electrode block 310 and the second touch electrode block 320 is a touch drive electrode for receiving touch drive signals from a touch chip (not shown), and the other is a touch sensing electrode for feeding back touch sensing signals to the touch chip. Touch positions are determined by detecting capacitance changes between the first touch electrode block 310 and the second touch electrode block 320, thereby achieving touch function for the display panel.

The first touch electrode block 310 and the second touch electrode block 320 are located in different layers to avoid interference, and no via is needed in the first insulating layer F1, thereby enhancing the structural strength of the display panel. Furthermore, the first gaps T are formed between the orthographic projections of the first touch electrode blocks 310 on the base plate 100 and the orthographic projections of the second touch electrode blocks 320 on the base plate 100. The plurality of first touch electrode blocks 310 extend along the first direction X and are spaced apart along the second direction Y, the plurality of second touch electrode blocks 320 extend along the second direction Y and are spaced apart along the first direction X, and thus if the orthographic projections of the first touch electrode block 310 and the second touch electrode block 320 on the base plate 100 are long-strip-shaped, such as rectangular, the orthographic projections of two first electrode blocks adjacent along the second direction Y and two second electrode blocks adjacent along the first direction X on the base plate 100 may form a first gap T.

Figure 10:
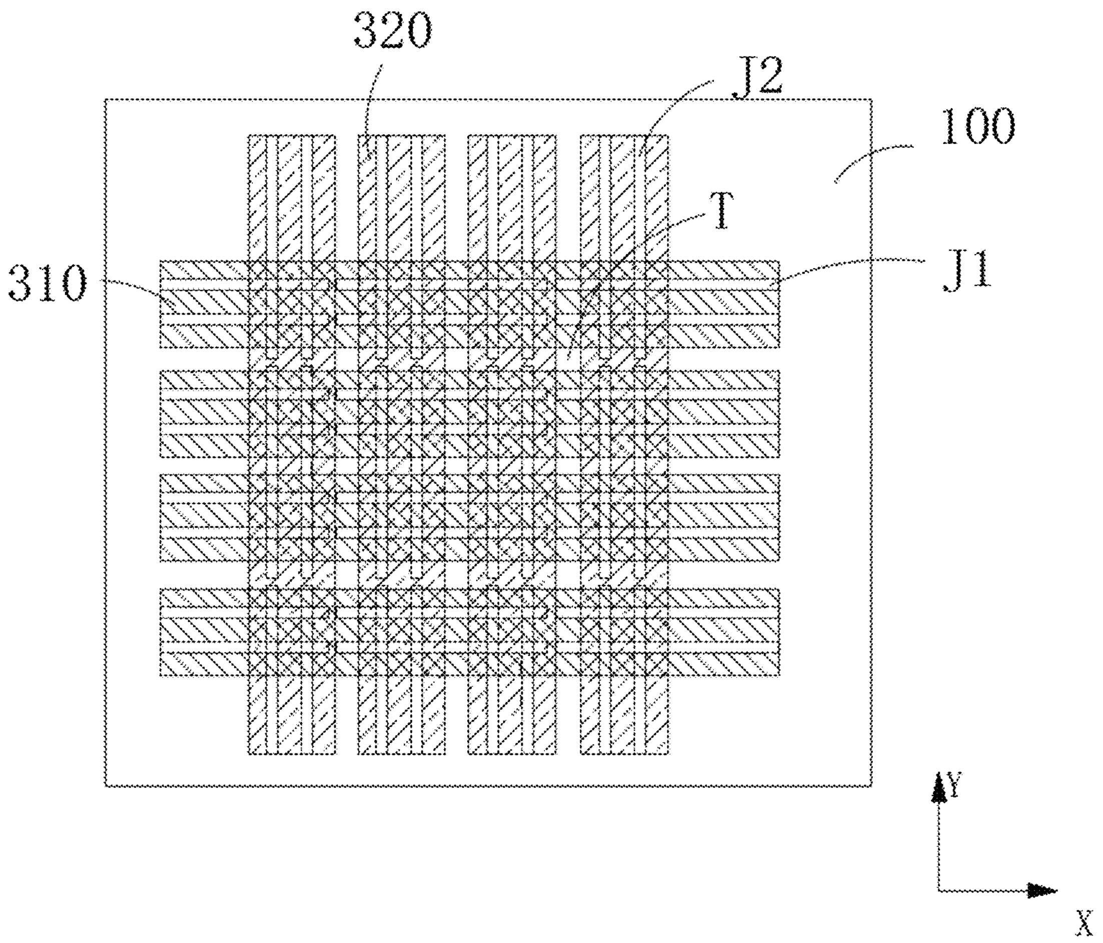
FIG. 10 shows a schematic structural diagram of a touch layer in a display panel according to yet another embodiment of the present application.
Figure 13:
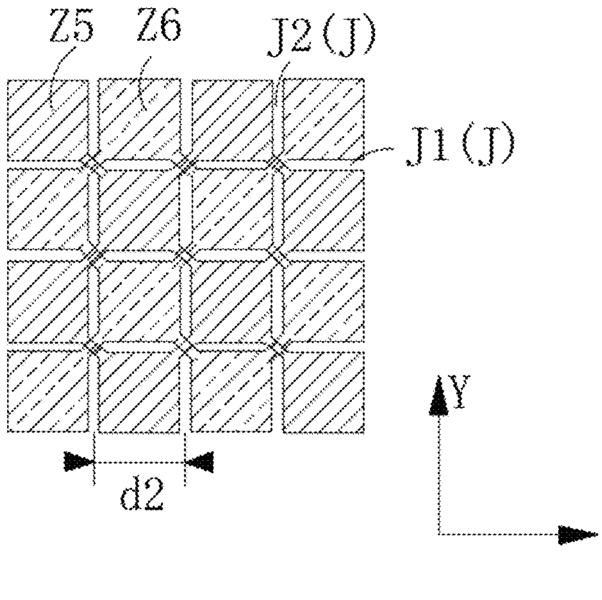
FIG. 13 shows a partial enlarged view of area E in FIG. 9 according to an embodiment of the present application.
Figure 14:
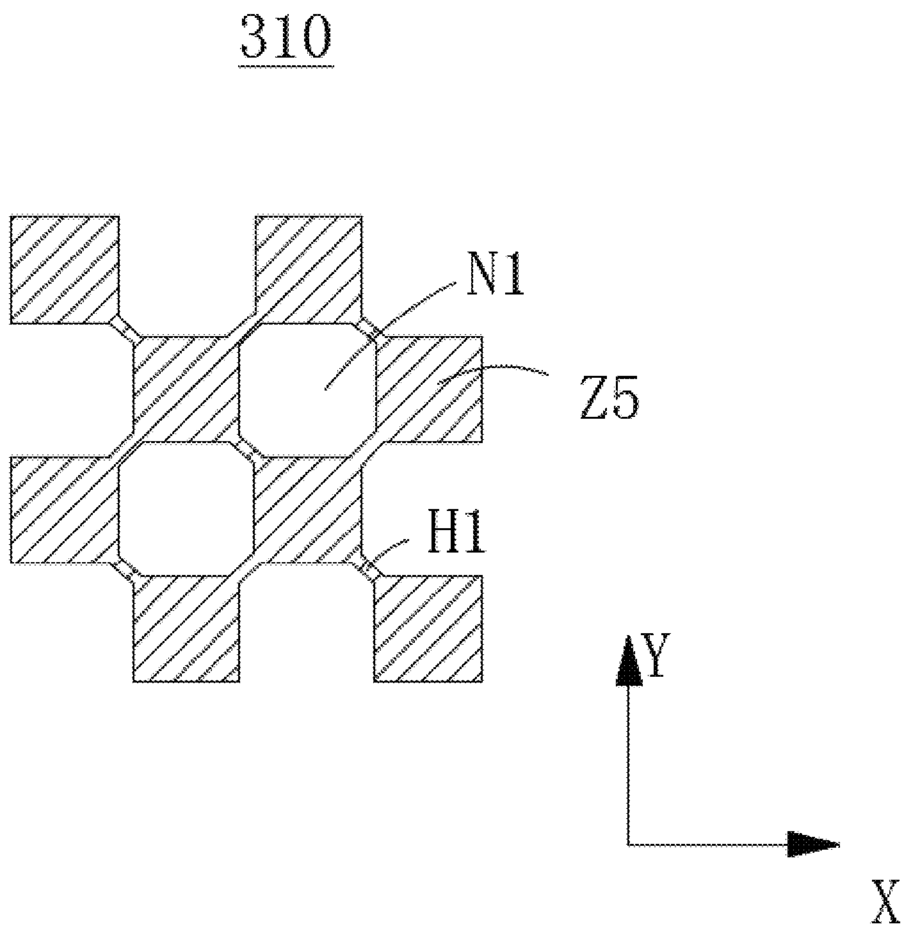
FIG. 14 shows a partial schematic diagram of a first touch electrode block according to an embodiment of the present application.
Figure 15:
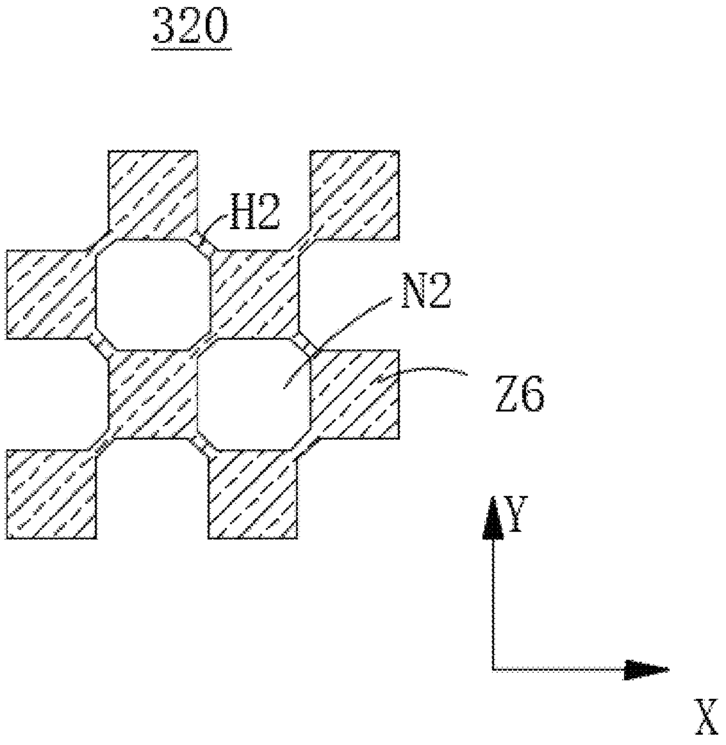
FIG. 15 shows a partial schematic diagram of a second touch electrode block according to an embodiment of the present application.

Referring to FIG. 10 or 13, in some optional embodiments, the first touch electrode block 310 includes at least one first sub-gap J1 extending in a direction consistent with the first direction X, and the second touch electrode block 320 includes at least one second sub-gap J2 extending in a direction consistent with the second direction Y.

In the embodiment, the extension direction of the first sub-gap J1 is consistent with the first direction X, and thus the first sub-gap J1 may be disposed correspondingly to the first gaps T, extending along the first direction X, formed between the orthographic projections of the first touch electrode blocks 310 on the base plate 100 and the orthographic projections of the second touch electrode blocks 320 on the base plate 100, there reducing visible bright lines formed correspondingly to the first gaps T. Similarly, the extension direction of the second sub-gap J2 is consistent with the second direction Y, and thus the second sub-gap J2 may be disposed correspondingly to the first gaps T, extending along the second direction X, formed between the orthographic projections of the first touch electrode blocks 310 on the base plate 100 and the orthographic projections of the second touch electrode blocks 320 on the base plate 100, there reducing visible bright lines formed correspondingly to the first gaps T.

Optionally, at an overlapping position between the first touch electrode block 310 and the second touch electrode block 320, the first touch electrode block 310 includes the first sub-gap J1 corresponding to the second sub-gap J2 on the second touch electrode block 320, and the second touch electrode block 320 includes the second sub-gap J2 corresponding to the first sub-gap J1 on the first touch electrode block 310.

In the embodiment, the first touch electrode block 310 including the first sub-gap J1 corresponding to the second sub-gap J2 on the second touch electrode block 320 means that the orthographic projection of this first sub-gap J1 on the base plate 100 falls within the second sub-gap J2 on the second touch electrode block 320 to achieve light transmitting. Similarly, the second touch electrode block 320 including the second sub-gap J2 corresponding to the first sub-gap J1 on the first touch electrode block 310 means that the orthographic projection of this second sub-gap J2 on the base plate 100 falls within the first sub-gap J1 on the first touch electrode block 310, thereby ensuring that light emitted from the light-emitting unit can be transmitted through the corresponding first sub-gap J1 and second sub-gap J2.

It should be noted that the specific structure of each of the touch electrode blocks 301 in the embodiment is also shown as FIG. 4 and includes a mesh structure consisting of a plurality of electrode strips L, within the touch electrode block 301, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T.

Figure 11:
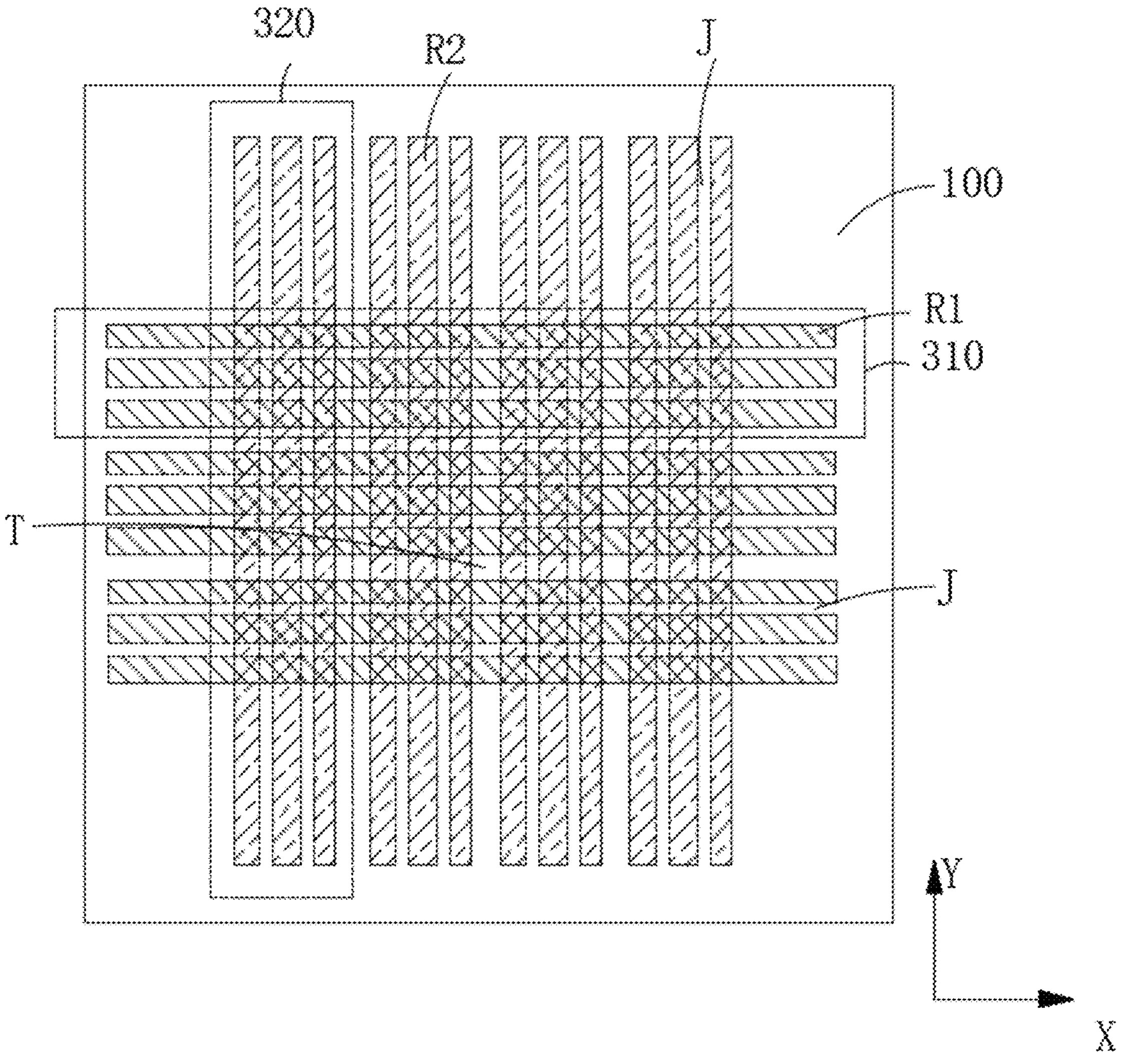
FIG. 11 shows a schematic structural diagram of a touch layer in a display panel according to yet another embodiment of the present application.
Figure 12:
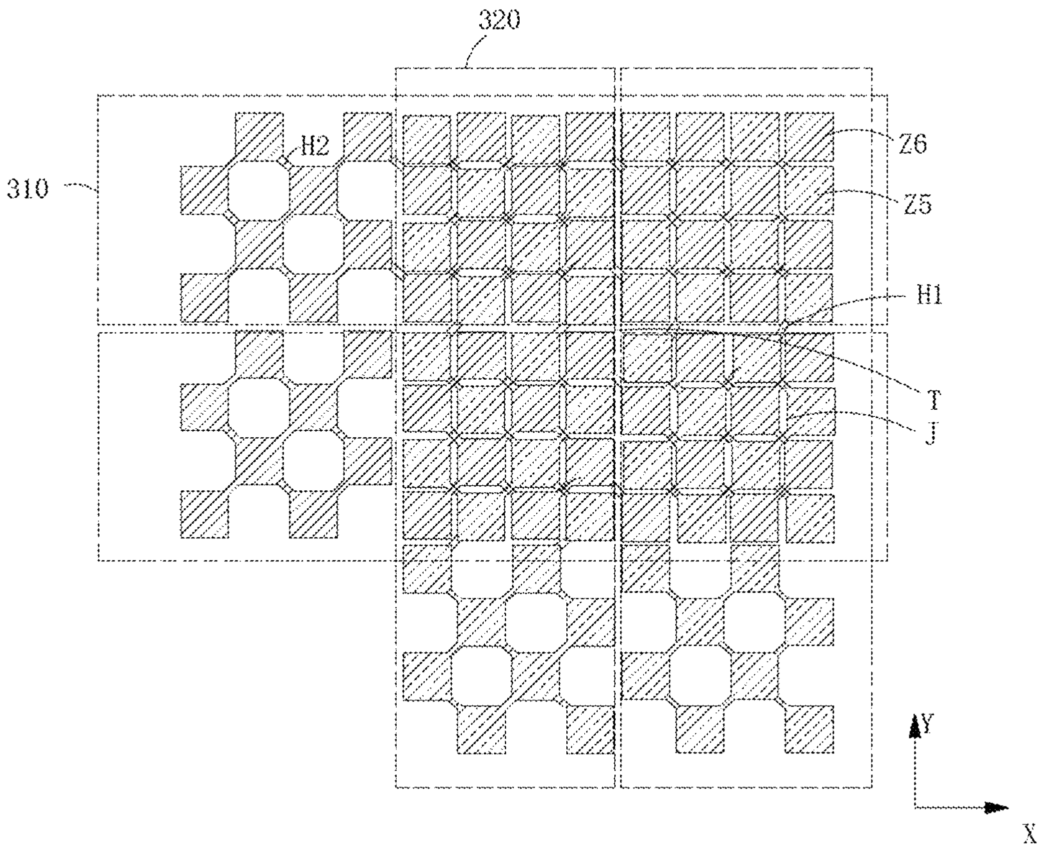
FIG. 12 shows a partial enlarged view of area F in FIG. 9 according to an embodiment of the present application.

Referring to FIG. 11, in some optional embodiments, the first touch electrode block 310 includes two or more first sub-wirings R1 spaced apart along the second direction Y, the second touch electrode block 320 includes two or more second sub-wirings R2 spaced apart along the first direction X, orthographic projections of adjacent first sub-wirings R1 on the base plate 100 form the second gap J separated by the second sub-wirings R2 into a plurality of segments and extending in a direction consistent with the first direction X, and orthographic projections of adjacent second sub-wirings R2 on the base plate 100 form the second gap J separated by the first sub-wirings R1 into a plurality of segments and extending in a direction consistent with the second direction Y.

It should be noted that in the embodiment, the various first sub-wirings R1 in the first touch electrode block 310 may be electrically insulated, compared with the dimension of the first touch electrode block 310 in the prior art, the first sub-wiring R1 is smaller, and the orthographic projections of adjacent first sub-wirings R1 on the base plate 100 form a plurality of second gaps J extending in a direction consistent the first direction X, which reduces the distance between the second gap J and an adjacent first gap T and increases corresponding line-shaped lights, so that the lights corresponding to the second gap J and an adjacent first gap T are denser, thereby reducing visible bright lines recognized by human eyes due to brightness changes. Similarly, the second touch electrode block 320 may be etched into a plurality of smaller second sub-wirings R2 through processes such as etching, and the orthographic projections of adjacent second sub-wirings R2 on base plate 100 form a plurality of second gaps J extending in a direction consistent the second direction Y. By forming the second gaps J, user experience is enhanced, and the display effect and performance of the display panel are improved.

Referring to FIGS. 12 to 15, in some optional embodiments, the first touch electrode block 310 includes a plurality of fifth sub-portions Z5 spaced apart along both the first direction X and the second direction Y and connected through first connecting portions H1, and the second touch electrode block 320 includes a plurality of sixth sub-portions Z6 spaced apart along both the first direction X and the second direction Y and connected through second connecting portions H2; the second gaps J are formed between orthographic projections of the fifth sub-portions Z5 on the base plate 100 and orthographic projections of the sixth sub-portions Z6 on the base plate 100, and the first gaps T are formed between orthographic projections of the first touch electrode blocks 310 and the second touch electrode blocks 320 on the base plate 100.

It should be noted that since the first gaps T are formed between the orthographic projections of the first touch electrode blocks 310 and the second touch electrode blocks 320 on the base plate 100, and the fifth sub-portions Z5 and the sixth sub-portions Z6 are spaced apart along both the first direction X and the second direction Y, the orthographic projection of the fifth sub-portion Z5 on the base plate 100 should be staggered relative to the orthographic projection of the sixth sub-portion Z6 on the base plate 100, that is, the orthographic projections of the fifth sub-portions Z5 and the sixth sub-portions Z6 on the base plate 100 are spaced apart to form the second gaps J.

Optionally, the plurality of fifth sub-portions Z5 form a plurality of first hollow portions N1, the plurality of sixth sub-portions Z6 form a plurality of second hollow portions N2, the sixth sub-portion Z6 is located correspondingly to the first hollow portion N1, and the fifth sub-portion Z5 is located correspondingly to the second hollow portion N2.

It should be noted that the specific structure of the fifth sub-portion Z5 and the sixth sub-portion Z6 in the embodiment is also shown as FIG. 4 and includes a mesh structure consisting of a plurality of electrode strips L, within the touch electrode block 301, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T.

In the embodiment, the orthographic projection of the fifth sub-portion Z5 on the film layer in which the second touch electrode block 320 is located does not overlap the sixth sub-portion Z6. For example, if the first touch electrode block 310 is disposed in the first conductive layer M1 and the second touch electrode block 320 is disposed in the second conductive layer M2, the orthographic projection of the fifth sub-portion Z5 on the second conductive layer M2 does not overlap the sixth sub-portion Z6, that is, the position on the second conductive layer M2 corresponding to the fifth sub-portion Z5 forms the second hollow portion N2. Similarly, the orthographic projection of the sixth sub-portion Z6 on the first conductive layer M1 does not overlap with the fifth sub-portion Z5, that is, the position on the second conductive layer M2 corresponding to the sixth sub-portion Z6 forms the first hollow portion N1, thereby reducing the capacitance between the fifth sub-portion Z5 and the sixth sub-portion Z6.

Figure 16:
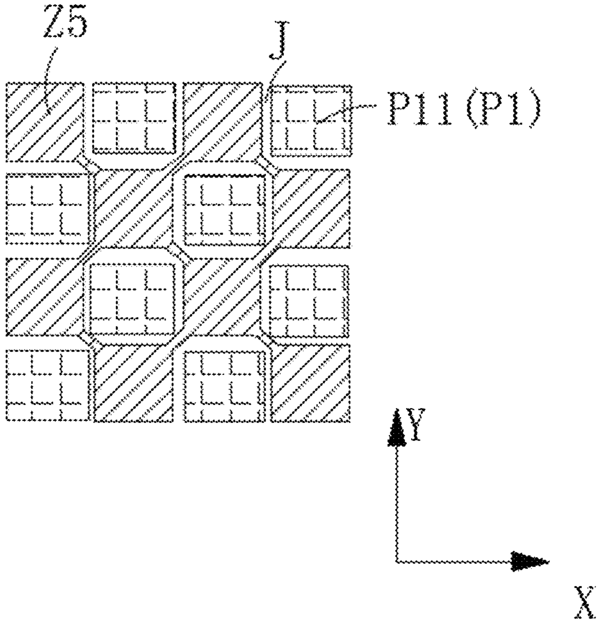
FIG. 16 shows a partial enlarged view of area G in FIG. 9 according to an embodiment of the present application.
Figure 17:
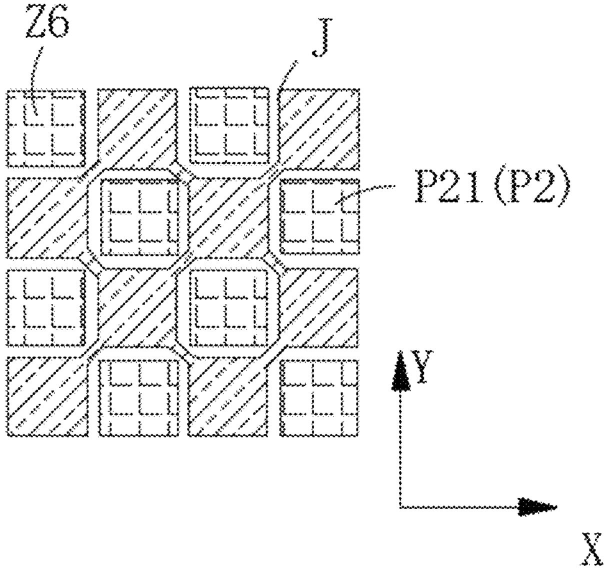
FIG. 17 shows a partial enlarged view of area H in FIG. 9 according to an embodiment of the present application.

Referring to FIGS. 16 to 17, in some optional embodiments, to ensure consistent light-transmitting effect at the positions corresponding to the fifth sub-portions Z5 and the sixth sub-portions Z6, dummy electrode blocks may be disposed in both the first conductive layer M1 and the second conductive layer M2.

Optionally, the touch layer 300 further includes dummy electrode blocks disposed in the same layer as the touch electrode blocks 301 and electrically insulated from the touch electrode blocks 301; and the second gaps J are formed between orthographic projections of at least a portion of the dummy electrode blocks on the base plate 100 and orthographic projections of adjacent touch electrode blocks 301 on the base plate 100, and/or the second gaps J are formed within the orthographic projections of at least a portion of the dummy electrode blocks on the base plate 100.

It may be understood that, the arrangement of a portion of the dummy electrode blocks is aimed to, on the one hand, reduce the capacitance between the touch electrode blocks, i.e., the dummy electrode block and the touch electrode block 301 are electrically insulated, and on the other hand, according to actual requirements, to from the second gaps J between the orthographic projections of a portion of the dummy electrode blocks on the base plate 100 and the orthographic projections of adjacent touch electrode blocks 301 on the base plate 100, thereby reducing visible bright lines.

According to the different dimensions and positions of the dummy electrode blocks, the second gaps J may also be formed within the dummy electrode blocks, that is, the second gaps J are formed within the orthographic projections of at least a portion of the dummy electrode blocks on the base plate 100, so as to cooperate with the second gaps J correspondingly formed within the touch electrode blocks 301 or with the first gaps T formed between the orthographic projections of adjacent touch electrode blocks 301 on base plate 100, thereby achieving that the distance between the second gap J formed between the orthographic projection of the dummy electrode block on the base plate 100 and the orthographic projection of an adjacent touch electrode block 301 on the base plate 100 and the adjacent first gap T is less than or equal to 200 μm, and/or the distance between any point on the second gap J formed between the orthographic projection of the dummy electrode block on the base plate 100 and the orthographic projection of an adjacent touch electrode block 301 on the base plate 100 and the second gap J correspondingly formed within the adjacent touch electrode block 301 is less than or equal to 200 μm.

It should be noted that the specific structure of the dummy electrode block in the embodiment is also shown as FIG. 4 and includes a mesh structure consisting of a plurality of electrode strips L.

Referring to FIGS. 16 to 17, if the first touch electrode block 310 includes a plurality of fifth sub-portions Z5 spaced apart along both the first direction X and the second direction Y and connected through first connecting portions H1, and the second touch electrode block 320 includes a plurality of sixth sub-portions Z6 spaced apart along both the first direction X and the second direction Y and connected through second connecting portions H2, correspondingly in some optional embodiments, the dummy electrode blocks further include first dummy electrode blocks P1 disposed in the same layer as the first touch electrode blocks 310 and electrically insulated from the first touch electrode blocks 310 and second dummy electrode blocks P2 disposed in the same layer as the second touch electrode blocks 320 and electrically insulated from the second touch electrode blocks 320, the first dummy electrode block P1 includes a first dummy sub-portion P11 located between adjacent fifth sub-portions Z5, and the second dummy electrode block P2 includes a second dummy sub-portion P21 located between adjacent sixth sub-portions Z6; and the second gap J is formed between an orthographic projection of the first dummy sub-portion P11 on the base plate 100 and orthographic projections of adjacent fifth sub-portions Z5 on the base plate 100, and the second gap J is formed between an orthographic projection of the second dummy sub-portion P21 on the base plate 100 and orthographic projections of adjacent sixth sub-portions Z6 on the base plate 100.

It may be understood that in the embodiment, the first dummy electrode block P1 and the first touch electrode block 310 are arranged adjacently in the same layer, and thus the second gap J may be formed between t the first dummy electrode block P1 and the first touch electrode block 310. Similarly, the second gap J is formed between the second dummy sub-portion P21 and the adjacent sixth sub-portions Z6, and the various first dummy electrode blocks P1 in the same layer may be electrically insulated to prevent connection with the first touch electrode block 310. The various second dummy electrode blocks P2 in the same layer may be electrically insulated to prevent connection with the second touch electrode block 320.

Optionally, the orthographic projections of the fifth sub-portions Z5 and the sixth sub-portions Z6 on the base plate 100 are all rectangular, the orthographic projections of the first dummy sub-portion P11 and the second dummy sub-portion P21 on the base plate 100 are all rectangular, and adjacent two sides of the rectangle may extend along the first direction X and the second direction Y, respectively. Optionally, the extension direction of a portion of the second gaps J formed between the orthographic projection of the first dummy sub-portion P11 on the base plate 100 and the orthographic projections of adjacent fifth sub-portions Z5 on the base plate 100 may be consistent with the first direction X, and the extension direction of a portion of the second gaps J may be consistent with the second direction Y, thereby reducing bright lines in the display panel along the first direction X and the second direction Y.

Similarly, the extension direction of a portion of the second gaps J formed between the orthographic projection of the second dummy sub-portion P21 on the base plate 100 and the orthographic projections of adjacent sixth sub-portions Z6 on the base plate 100 may be consistent with the first direction X, and the extension direction of a portion of the second gaps J may be consistent with the second direction Y.

It should be noted that two directions being consistent herein means that the two directions are parallel, while allowing a certain range of deviation provided that the required final light-emitting effect is not degraded. For example, two directions form a deviation of ±15° relative to complete parallelism, but these two directions are still considered as consistent if the overall light uniformity requirement is satisfied. Optionally, the orthographic projections of the fifth sub-portion Z5, the sixth sub-portion Z6, the first dummy sub-portion P11, and the second dummy sub-portion P21 on the base plate 100 are all the same to facilitate fabrication and enhance light transmittance.

In some optional embodiments, the second gap J between the orthographic projection of the first dummy sub-portion P11 on the base plate 100 and the orthographic projections of adjacent fifth sub-portions Z5 on the base plate 100 completely overlaps the second gap J between the orthographic projection of the second dummy sub-portion P21 on the base plate 100 and the orthographic projections of adjacent sixth sub-portions Z6 on the base plate 100.

Under a condition that the first dummy sub-portion P11 and the fifth sub-portion Z5 are located in the first conductive layer M1 and the second dummy sub-portion P21 and the sixth sub-portion Z6 are located in the second conductive layer M2, light emitted by the light-emitting unit may sequentially pass through the second gap J between the orthographic projection of the first dummy sub-portion P11 on the base plate 100 and the orthographic projections of adjacent fifth sub-portions Z5 on the base plate 100 and the second gap J between the orthographic projection of the second dummy sub-portion P21 on the base plate 100 and the orthographic projections of adjacent sixth sub-portions Z6 on the base plate 100, so as to avoid the light emitted by the light-emitting unit being blocked by the second dummy sub-portion P21 or the sixth sub-portion Z6 after passing through the second gap J between the orthographic projection of the first dummy sub-portion P11 on the base plate 100 and the orthographic projections of adjacent fifth sub-portions Z5 on the base plate 100, thereby ensuring the effectiveness of all the second gaps J.

Figure 19:
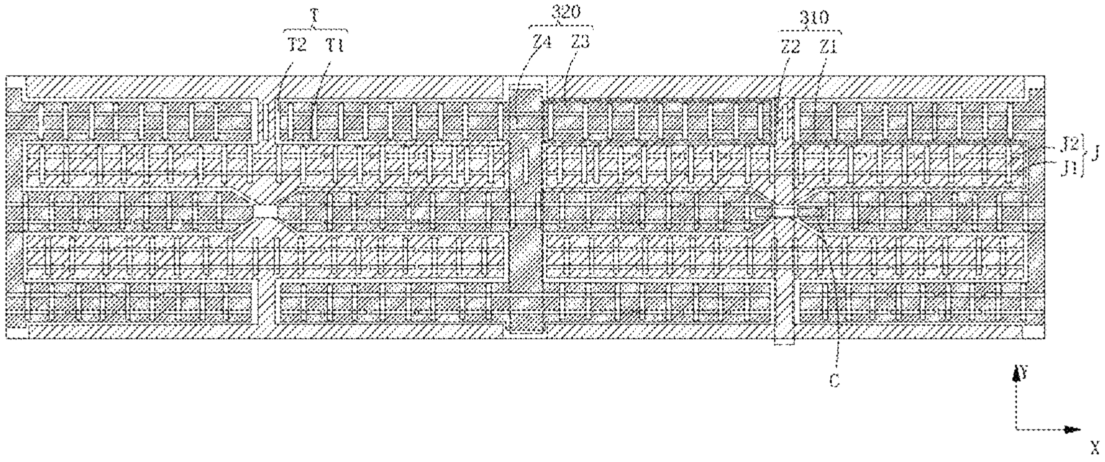
FIG. 19 shows a schematic structural diagram of a touch layer in a display panel according to yet another embodiment of the present application.

Referring to FIG. 19, in some optional embodiments, the various touch electrode blocks 301 are located in the same layer, and the first gap T is formed between adjacent touch electrode blocks 301.

It may be understood that since the various touch electrode blocks 301 are located in the same layer, both the first gap T and the second gap J are formed by the touch electrode blocks 301 in the same layer, with no interference between them.

Figure 21:
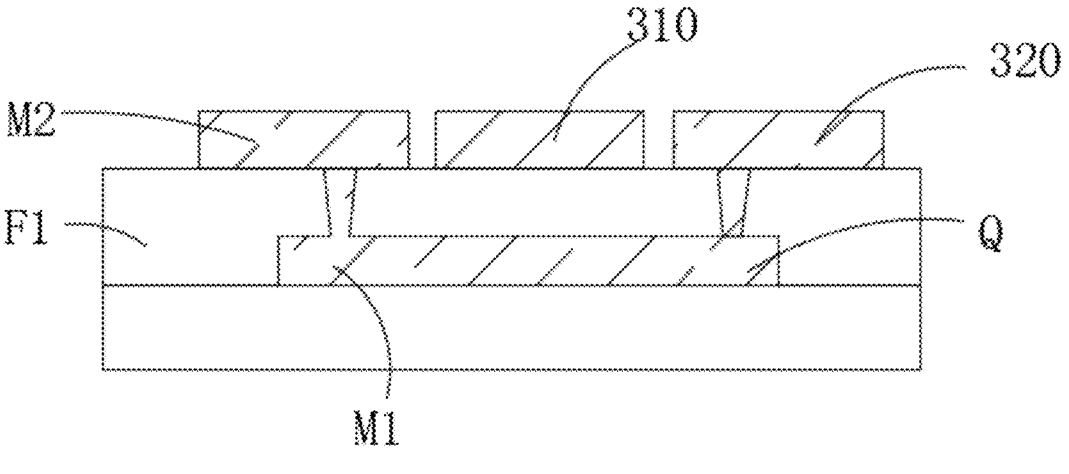
FIG. 21 shows a schematic structural diagram of a touch layer according to another embodiment of the present application.
Figure 22:
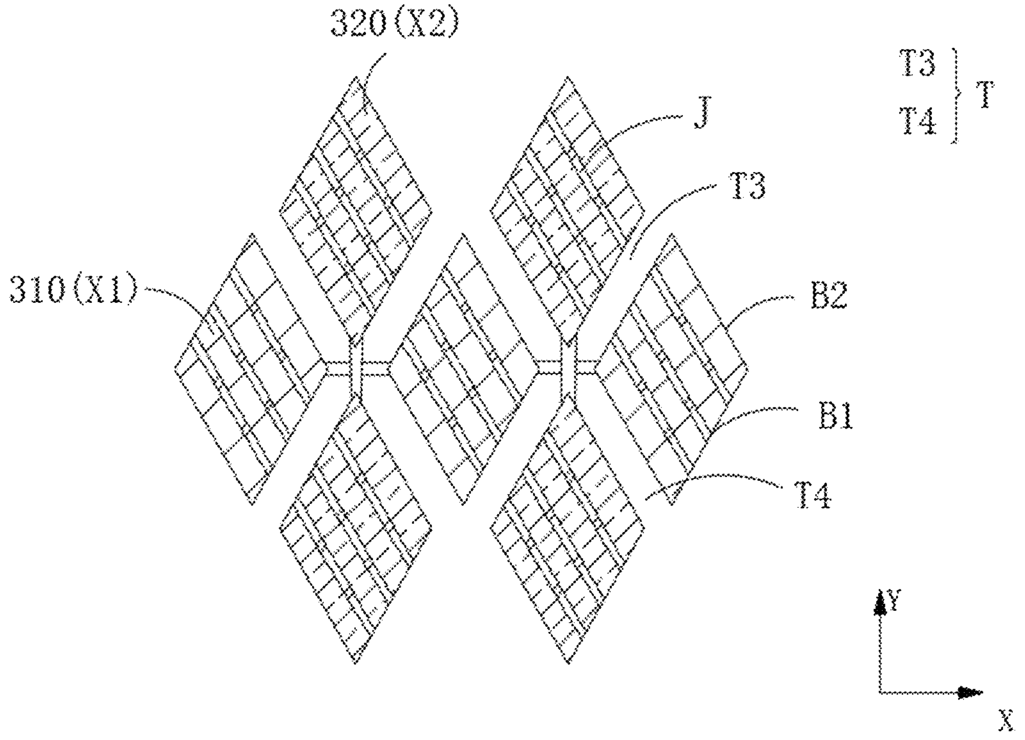
FIG. 22 shows a schematic structural diagram of a touch layer in a display panel according to yet another embodiment of the present application.

Referring to FIGS. 21 to 22, in some optional embodiments, along the direction away from the plane in which the base plate 100 is located, the touch layer 300 includes the first conductive layer M1, the first insulating layer F1, and the second conductive layer M2 that are stacked; the touch electrode blocks 301 include a plurality of first touch electrode blocks 310 and a plurality of second touch electrode blocks 320, the plurality of first touch electrode blocks 310 are electrically connected along the first direction X to form first touch wirings X1, the plurality of second touch electrode blocks 320 are electrically connected along the second direction Y to form second touch wirings X2, the first touch wirings X1 are spaced apart along the second direction Y, the second touch wirings X2 are spaced apart along the first direction X, the first touch electrode block 310 and the second touch electrode block 320 are located in a same one of the first conductive layer M1 and the second conductive layer M2, and the first direction X intersects the second direction Y.

It may be understood that in the embodiment, the touch layer 300 may have a mutual-capacitive touch structure, and the first touch wiring X1 and the second touch wiring X2 are located in the same layer, in which one of the first touch wiring and the second touch wiring is a touch drive electrode for receiving touch drive signals from a touch chip (not shown), and the other is a touch sensing electrode for feeding back touch sensing signals to the touch chip. Touch positions are determined by detecting capacitance changes between the first touch wiring and the second touch wiring, thereby achieving touch function for the display panel.

Optionally, the first touch electrode block 310 and the second touch electrode block 320 are both located in the second conductive layer M2, and the first gaps T are formed between orthographic projections of the first touch electrode blocks 310 and the second touch electrode blocks 320 on the base plate 100. Specifically, the first gap T is formed between corresponding sides of the first touch electrode block 310 and the second touch electrode block 320 that are adjacent.

Since the first touch electrode block 310 and the second touch electrode block 320 are located in the same layer, to avoid interference and facilitate forming the first touch wiring X1 between adjacent first touch electrode blocks 310 or forming the second touch wiring X2 between adjacent second touch electrode blocks 320, optionally, the touch layer 300 further includes a bridging portion disposed in the first conductive layer M1, along the first direction X, adjacent two first touch electrode blocks 310 are electrically connected through the bridging portion and a via located in the first insulating layer F1; or along the second direction Y, adjacent two first touch electrode blocks 310 are electrically connected through the bridging portion and a via located in the first insulating layer F1.

Figure 20:
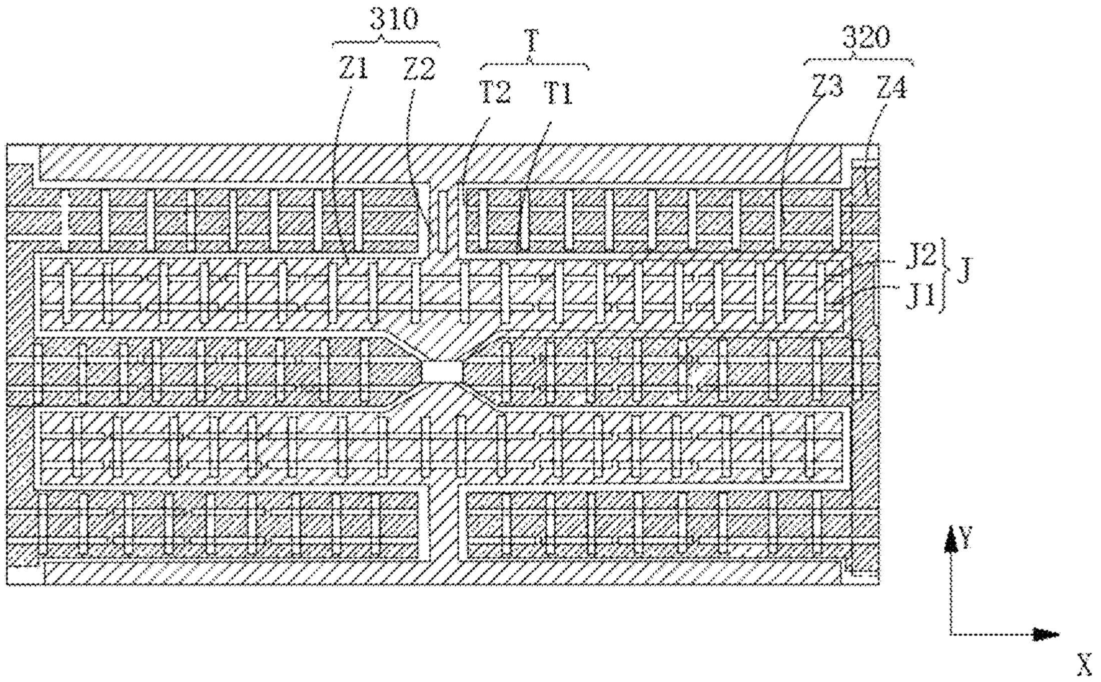
FIG. 20 shows a schematic structural diagram of a first touch electrode block and a second touch electrode block according to an embodiment the present application.

Referring to FIGS. 19 to 20, in some optional embodiments, the first touch electrode block 310 includes first sub-portions Z1 and second sub-portions Z2 that are connected, the second touch electrode block 320 includes third sub-portions Z3 and fourth sub-portions Z4 that are connected, the first sub-portion Z1 and the third sub-portion Z3 extend along the first direction X, the second sub-portion Z2 and the fourth sub-portion Z4 extend along the second direction Y, the first sub-portions Z1 are spaced apart along the second direction Y, the second sub-portion Z2 is located between the first sub-portions Z1 adjacent along the second direction Y, the third sub-portions Z3 are spaced apart along the second direction Y, the fourth sub-portion Z4 is located between the third sub-portions Z3 adjacent along the second direction Y, and along the second direction Y, the fourth sub-portion Z4 is disposed between adjacent first sub-portions Z1, the second sub-portion Z2 is disposed between adjacent third sub-portions Z3; the first gap T extending along the first direction X is formed between orthographic projections of the first sub-portion Z1 and the third sub-portion Z3 on the base plate 100, the first gap T extending along the second direction Y is formed between orthographic projections of the first sub-portion Z1 and the fourth sub-portion Z4 on the base plate 100, and the first gap T extending along the second direction Y is formed between orthographic projections of the third sub-portion Z3 and the second sub-portion Z2 on the base plate 100; and a first sub-gap J1 extending in a direction consistent with the first direction X is formed within an orthographic projection of at least one of the first sub-portion Z1, the second sub-portion Z2, the third sub-portion Z3, and the fourth sub-portion Z4 on the base plate 100; and/or a second sub-gap J2 extending in a direction consistent with the second direction Y is formed within an orthographic projection of at least one of the first sub-portion Z1, the second sub-portion Z2, the third sub-portion Z3, and the fourth sub-portion Z4 on the base plate 100.

It should be noted that in the embodiment, since the first touch electrode block 310 and the second touch electrode block 320 each include two portions extending along the first direction X and the second direction Y, respectively, a portion of the formed first gaps T extend along the first direction X, and a portion of the formed first gaps T extend along the second direction Y. Correspondingly, the first sub-gap J1 extending in a direction consistent with the first direction X may be formed within the orthographic projection of at least one of the first sub-portion Z1, the second sub-portion Z2, the third sub-portion Z3, and the fourth sub-portion Z4 on the base plate 100, that is the first sub-gap J1 may be disposed correspondingly to the first gap T extending along the first direction X, so as to reduce visible bright lines corresponding to the first gap T extending along the first direction X. Similarly, the second sub-gap J2 extending in a direction consistent with the second direction Y may be further formed within the orthographic projection of at least one of the first sub-portion Z1, the second sub-portion Z2, the third sub-portion Z3, and the fourth sub-portion Z4 on the base plate 100, and the second sub-gap J2 may be disposed correspondingly to the first gap T extending along the second direction Y, so as to reduce visible bright lines corresponding to the first gap T extending along the second direction Y.

It should be noted that in the embodiment, according to actual requirements, only one of the first sub-gap J1 and the second sub-gap J2 may be disposed, or both the first sub-gap J1 and the second sub-gap J2 may be disposed, which is not limited herein.

Optionally, the first sub-gap J1 intersects the second sub-gap J2.

Optionally, the extension directions of the second gaps J within the orthographic projections of the first sub-portion Z1 and the second sub-portion Z2 on the base plate 100 are consistent to increase arrangement regularity of the second gaps J and reduce bright lines visible to human eyes.

Optionally, the extension direction of the second gap J within the orthographic projection of the first sub-portion Z1 on the base plate 100 and the extension direction of the second gap J within the orthographic projection of the second sub-portion Z2 on the base plate 100 are both consistent with the first direction X, that is, the extension directions of the second gaps J formed correspondingly to the first sub-portion Z1 and the second sub-portion Z2 are all consistent with the first direction X, so as to correspond to the first gaps T formed correspondingly to the long sides of the first sub-portion Z1 and the second sub-portion Z2 along the first direction X.

Figure 23:
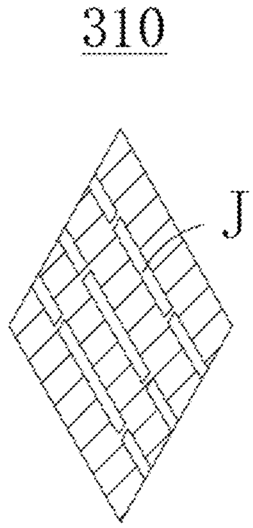
FIG. 23 shows a schematic structural diagram of a first touch electrode block according to an embodiment the present application.

It should be noted that the specific structure of the first touch electrode block 310 and the second touch electrode block 320 in the embodiment is also shown as FIG. 4 and includes a mesh structure consisting of a plurality of electrode strips L, within the first touch electrode block 310 and the second touch electrode block 320, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T. Referring to FIGS. 22 to 23, in some optional embodiments, the orthographic projections of the first touch electrode block 310 and the second touch electrode block 320 on the base plate 100 are both rhombus shaped; the rhombus includes a first side B1 and a second side B2 that are connected; the first gaps T include a fifth sub-gap T3 extending in a direction consistent with an extension direction of the first side B1, and a sixth sub-gap T4 extending in a direction consistent with an extension direction of the second side B2; the second gap J extending in a direction consistent with an extension direction of one of the fifth sub-gap T3 and the sixth sub-gap T4 is formed within each of the orthographic projections of the first touch electrode block 310 and the second touch electrode block 320 on the base plate 100.

It may be understood that in the embodiment, since the orthographic projections of the first touch electrode block 310 and the second touch electrode block 320 on the base plate 100 are both rhombus shaped, the first gaps T formed between the orthographic projections of the first touch electrode block 310 and the second touch electrode block 320 that are adjacent on the base plate 100 include the fifth sub-gap T3 and the sixth sub-gap T4 extending in different directions. According to actual requirements, the second gap J may be formed within each of the orthographic projections of the first touch electrode block 310 and the second touch electrode block 320 on the base plate 100, and the extension direction of the second gap J is consistent with the extension direction of the fifth sub-gap T3 to reduce visible bright lines formed correspondingly to the fifth sub-gap T3, and/or consistent with the extension direction of the sixth sub-gap T4 to reduce visible bright lines formed correspondingly to the sixth sub-gap T4.

Optionally, in the embodiment, the extension directions of the first side B1 and the second side B2 each intersect the first direction X and the second direction Y, and correspondingly, the extension direction of the second gap J also intersects the first direction X and the second direction Y.

The fifth sub-gap T3 is formed correspondingly between the first sides B1 of the first touch electrode block 310 and the second touch electrode block 320 that are adjacent, and the sixth sub-gap T4 is formed correspondingly between the second sides B2 of the first touch electrode block 310 and the second touch electrode block 320 that are adjacent.

Optionally, the extension directions of the second gaps J within the orthographic projections of the first touch electrode block 310 and the second touch electrode block 320 on the base plate 100 are consistent with each other.

Specifically, the extension directions of the second gaps J within the orthographic projections of the first touch electrode block 310 and the second touch electrode block 320 on the base plate 100 may be parallel with each other to increase arrangement regularity and reduce bright lines visible to the human eyes. Alternatively, considering factors such as fabrication process precision, the extension directions of the second gaps J within the orthographic projections of the first touch electrode block 310 and the second touch electrode block 320 on the base plate 100 may form a certain angle. For example, the angle between the extension directions of the second gaps J within the orthographic projections of the first touch electrode block 310 and the second touch electrode block 320 on the base plate 100 may be less than or equal to 5°.

Referring to FIGS. 2 and 24 to 27, in some optional embodiments, the touch layer 300 includes a plurality of touch electrode blocks 301 that are spaced apart and electrically insulated along both the first direction X and the second direction Y, along the first direction X, the first gap T is formed between orthographic projections of adjacent touch electrode blocks 301 on the base plate 100, and along the second direction Y, the first gap T is formed between orthographic projections of adjacent touch electrode blocks 301 on the base plate 100.

It may be understood that in the embodiment, the display panel has a self-capacitive touch structure, in which the various touch electrode blocks 301 are electrically insulated and transmit touch signals independently. Along the first direction X, the first gap T is formed between orthographic projections of adjacent touch electrode blocks 301 on the base plate 100, and the extension trajectory of the first gap T is consistent with the extension direction of the corresponding edge of the touch electrode block 301, that is, the first gap T is formed between the edges of the orthographic projections of the touch electrode blocks 301 adjacent along the first direction X on the base plate 100. Similarly, along the second direction Y, the extension direction of the first gap T formed between orthographic projections of adjacent touch electrode blocks 301 on the base plate 100 is consistent with the extension direction of the opposite edges of the orthographic projections of the touch electrode blocks 301 adjacent along the second direction Y on the base plate 100.

Optionally, the orthographic projection of the touch electrode block 301 on the base plate 100 is rectangular.

It should be noted that the specific structure of the touch electrode block 301 in the embodiment is also shown as FIG. 4 and includes a mesh structure consisting of a plurality of electrode strips L, within the touch electrode block 301, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T.

In some optional embodiments, the second gap J may be formed within the touch electrode block 301, that is, the second gap J is formed within the orthographic projection of the touch electrode block 301 on the base plate 100, and the extension direction of the second gap J is consistent with the extension direction of the first gap T between the touch electrode blocks 301 adjacent along the first direction X; and/or the extension direction of the second gap J is consistent with the extension direction of the first gap T between the touch electrode blocks 301 adjacent along the second direction Y.

For example, if the orthographic projection of the touch electrode block 301 on the base plate 100 is rectangular and adjacent two sides of the rectangle extend along the first direction X and the second direction Y, respectively, along the first direction X, the first gap T formed between the orthographic projections of adjacent touch electrode blocks 301 on the base plate 100 extends along the second direction Y, and along the second direction Y, the first gap T formed between the orthographic projections of adjacent touch electrode blocks 301 on the base plate 100 extends along the first direction X. Alternatively, along the first direction X, the first gap T formed between the orthographic projections of adjacent touch electrode blocks 301 on the base plate 100 may form a certain angle with the second direction Y and is not parallel to the second direction Y, and along the second direction Y, the first gap T formed between the orthographic projections of adjacent touch electrode blocks 301 on the base plate 100 may also form a certain angle with the first direction X.

Figure 24:
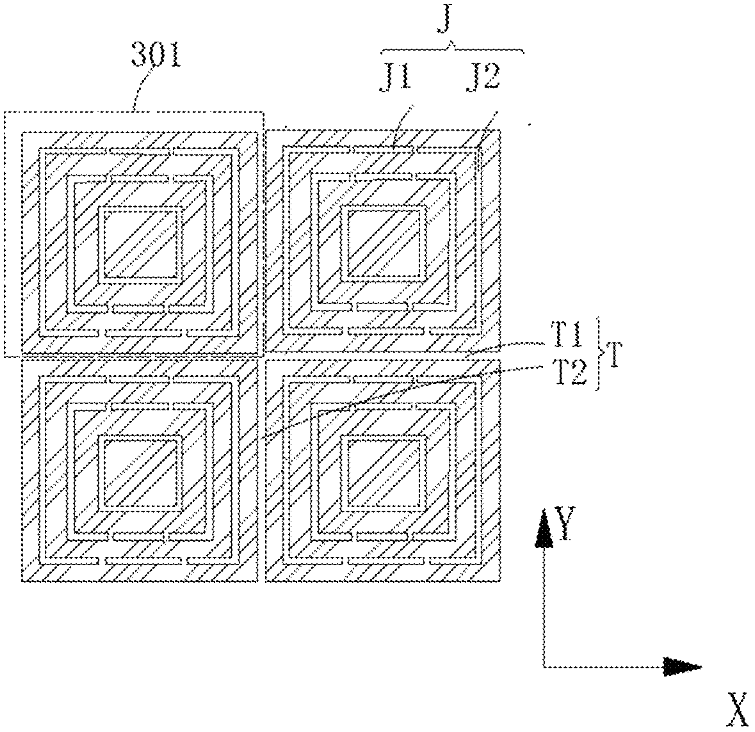
FIG. 24 shows a schematic structural diagram of a touch layer in a display panel according to yet another embodiment of the present application.
Figure 26:
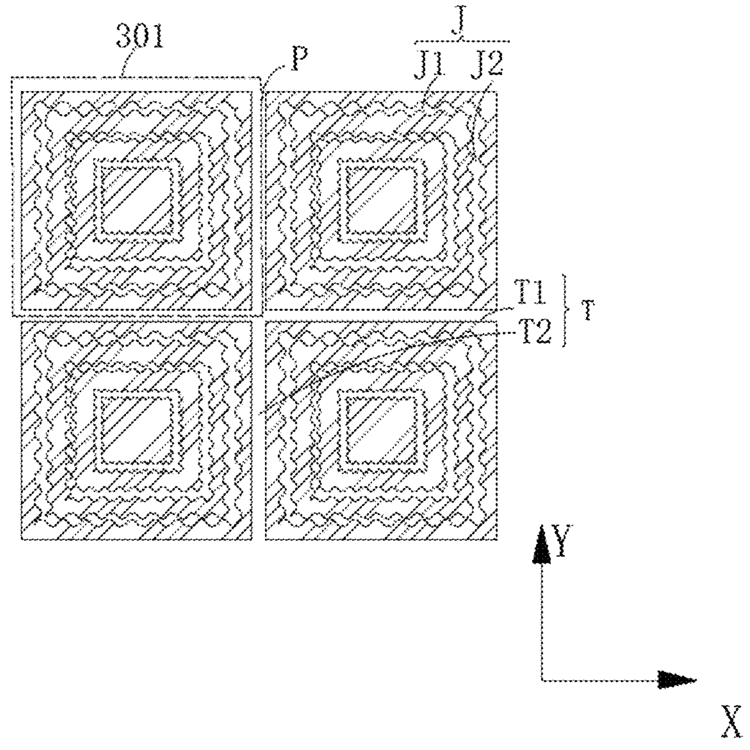
FIG. 26 shows a schematic structural diagram of a touch layer in a display panel according to yet another embodiment of the present application.

Referring to FIG. 24 or 26, in some optional embodiments, orthographic projections of the second gaps J, within the orthographic projection of the touch electrode block 301 on the base plate 100, on the base plate 100 are arranged as concentric rings.

It may be understood that since the second gap J needs to intersect at least one electrode strip L, the orthographic projection of the second gap J, within the orthographic projection of the touch electrode block 301 on the base plate 100, on the base plate 100 may be arranged as a non-closed ring structure, and the unbroken electrode strip L is located at the opening of the ring structure.

Optionally, the shape of the concentric rings of the orthographic projections of the second gaps J, within the orthographic projection of the touch electrode block 301 on the base plate 100, on the base plate 100 is consistent with the shape of the orthographic projection of the touch electrode block 301 on the base plate 100 and/or the extension direction of the first gap T formed between the orthographic projections of adjacent touch electrode blocks 301 on the base plate 100.

For example, if the orthographic projection of the touch electrode block 301 on the base plate 100 is rectangular, the orthographic projections of the second gaps J, within the orthographic projection of the touch electrode block 301 on the base plate 100, on the base plate 100 may be arranged as rectangular concentric rings, and the various sides of the corresponding rectangular ring are consistent with the extension direction of the first gap T formed between the orthographic projections of the corresponding adjacent touch electrode blocks 301 on the base plate 100.

Referring to FIGS. 24 to 27, optionally, within an orthographic projection of a single touch electrode block 301 on the base plate 100, the second gaps J include a plurality of first sub-gaps J1 arranged side-by-side and a plurality of second sub-gaps J2 arranged side-by-side; and an extension direction of the first sub-gap J1 is consistent with an extension direction of the first gap T between the touch electrode blocks 301 adjacent along the first direction X, an extension direction of the second sub-gap J2 is consistent with an extension direction of the first gap T between the touch electrode blocks 301 adjacent along the second direction Y, and the first sub-gap J1 intersects the second sub-gap J2.

It may be understood that in the embodiment, both the first sub-gap J1 and the second sub-gap J2 may be correspondingly arranged within a single touch electrode block 301, and the first sub-gap J1 intersects the second sub-gap J2, so as to reduce the distance between the first sub-gap J1 and the first gap T between the touch electrode blocks 301 adjacent along the first direction X, and the distance between the second sub-gap J2 and the first gap T between the touch electrode blocks 301 adjacent along the second direction Y.

Referring to FIG. 2, optionally, a plurality of first sub-gaps J1 intersect a plurality of second sub-gaps J2, respectively, to form rectangular or rhombic areas, and the like, that is, a plurality of first sub-gaps J1 and a plurality of second sub-gaps J2 form a mesh pattern.

Figure 25:
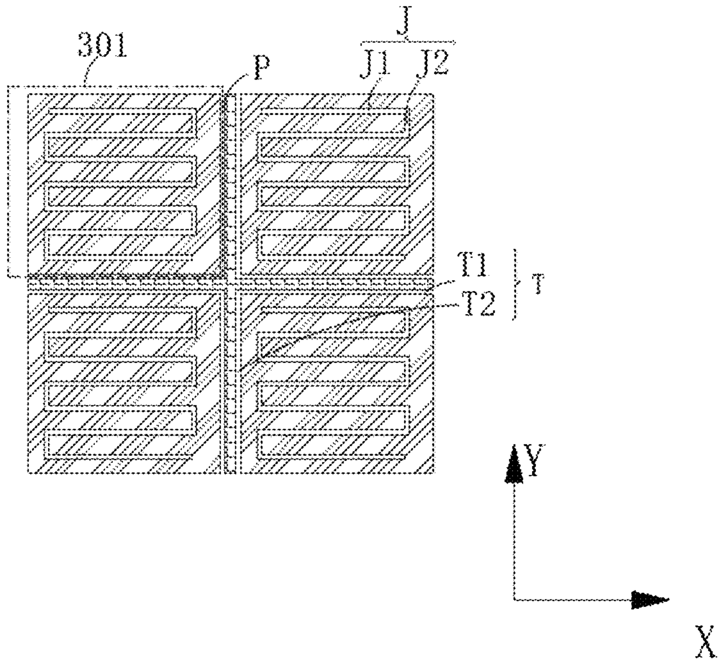
FIG. 25 shows a schematic structural diagram of a touch layer in a display panel according to yet another embodiment of the present application.
Figure 27:
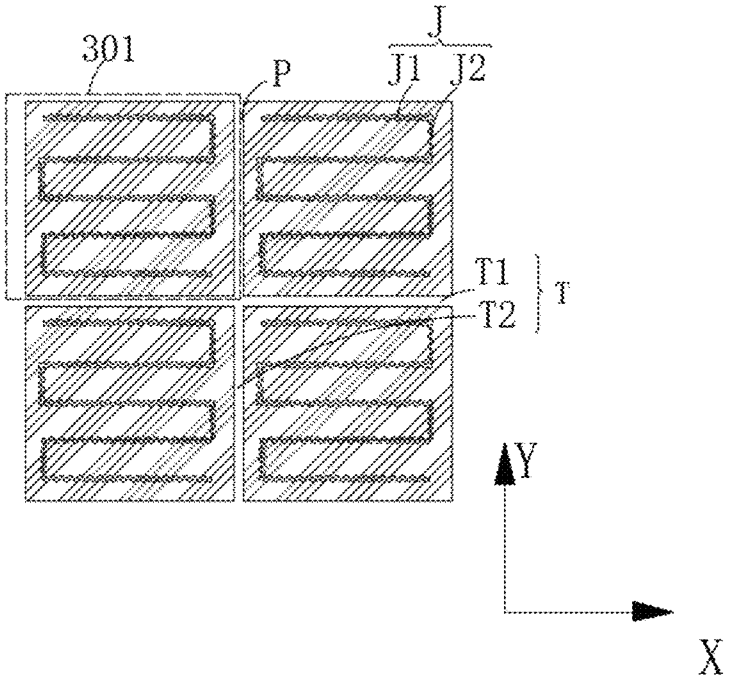
FIG. 27 shows a schematic structural diagram of a touch layer in a display panel according to yet another embodiment of the present application.

Referring to FIG. 25 or 27, alternatively, the first sub-gap J1 and the second sub-gap J2 may be connected end-to-end, that is, the first end of a first sub-gap J1 may be connected with one end of a second sub-gap J2, the other end of the second sub-gap J2 may be connected with the second end of another first sub-gap J1, and such connection pattern repeats to form a second gap J which is snake-shaped or bow-shaped.

Optionally, the extension trajectory of the first sub-gap J1 and the second sub-gap J2 may be one of a straight line, a bend line, and a wavy line, and should be specifically selected according to the position of the first dot-shaped gap J10. If the extension trajectory of the first sub-gap J1 and the second sub-gap J2 is a bend line, the corresponding extension direction refers to the overall extension direction of the entire first sub-gap J1 and the entire second sub-gap J2, not the extension direction of any specific segment of the bend line. Similarly, if the extension trajectory of the first sub-gap J1 and the second sub-gap J2 is a wavy line, the corresponding extension direction refers to the overall extension direction of the entire first sub-gap J1 and the entire second sub-gap J2, not the extension direction of any specific segment of the wavy line.

Referring to FIGS. 9 and 12 to 15, the embodiments of the present application further provide a display panel, including: a base plate 100; a light-emitting layer 200 disposed at one side of the base plate 100 and including light-emitting units; and a touch layer 300 disposed at a side of the light-emitting layer 200 away from the base plate 100 and including a plurality of touch electrode blocks 301, along a direction away from a plane in which the base plate 100 is located, the touch layer 300 including a first conductive layer M1, a first insulating layer F1, and a second conductive layer M2 that are stacked, the touch electrode blocks 301 including a plurality of first touch electrode blocks 310 and a plurality of second touch electrode blocks 320, one of the first touch electrode block 310 and the second touch electrode block 320 being located in the first conductive layer M1, and the other being located in the second conductive layer M2, the plurality of first touch electrode blocks 310 extending along a first direction X and being spaced apart along a second direction Y, the plurality of second touch electrode blocks 320 extending along the second direction Y and being spaced apart along the first direction X, and the first direction X intersecting the second direction Y; the first touch electrode block 310 including a plurality of fifth sub-portions Z5 spaced apart along both the first direction X and the second direction Y and connected through first connecting portions H1, and the second touch electrode block 320 including a plurality of sixth sub-portions Z6 spaced apart along both the first direction X and the second direction Y and connected through second connecting portions H2; second gaps J being formed between orthographic projections of the fifth sub-portions Z5 on the base plate 100 and orthographic projections of the sixth sub-portions Z6 on the base plate 100, first gaps T being formed between orthographic projections of the first touch electrode blocks 310 and the second touch electrode blocks 320 on the base plate 100, a distance d1 between any point on the second gap J and an adjacent first gap T being less than or equal to 200 μm, and/or a distance d2 between any point on the second gap J and an adjacent second gap J being less than or equal to 200 μm.

The display panel according to the embodiments of the present application includes the base plate 100, the light-emitting layer 200, and the touch layer 300, since the first gaps T are formed between the orthographic projections of the first touch electrode blocks 310 and the second touch electrode blocks 320 on the base plate 100, the fifth sub-portions Z5 are spaced apart along both the first direction X and the second direction Y, and the sixth sub-portions Z6 are spaced apart along both the first direction X and the second direction Y, therefore the orthographic projections of the fifth sub-portions Z5 on the base plate 100 and the orthographic projections of the sixth sub-portions Z6 on the base plate 100 should be staggered, that is, the orthographic projections of the fifth sub-portions Z5 on the base plate 100 and the orthographic projections of the sixth sub-portions Z6 on the base plate 100 are spaced apart to form the second gaps J. The embodiments of the present application limit the distance d1 between any point on the second gap J and a correspondingly adjacent first gap T to be less than or equal to 200 μm, and/or the distance d2 between any point on the second gap J and an adjacent second gap J to be less than or equal to 200 μm, so as to increase the overall arrangement density of the second gaps J and the first gaps T. The inventors have found that, due to the recognition limitation of human eyes, under a condition that the distance d1 between any point on the second gap J and an adjacent first gap T is less than or equal to 200 μm, and/or the distance d2 between any point on the second gap J and an adjacent second gap J is less than or equal to 200 μm, the distances between the line-shaped lights generated by the second gaps J or the first gaps T are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

It should be noted that the specific structure of the first touch electrode block 310 and the second touch electrode block 320 in the embodiment is also shown as FIG. 4 and includes a mesh structure consisting of a plurality of electrode strips L, within the first touch electrode block 310 and the second touch electrode block 320, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T.

Referring to FIG. 11, in some optional embodiments, the first touch electrode block 310 includes two or more first sub-wirings R1 spaced apart along the second direction Y, the second touch electrode block 320 includes two or more second sub-wirings R2 spaced apart along the first direction X, orthographic projections of adjacent first sub-wirings R1 on the base plate 100 form the second gap J separated by the second sub-wirings R2 into a plurality of segments and extending in a direction consistent with the first direction X, and orthographic projections of adjacent second sub-wirings R2 on the base plate 100 form the second gap J separated by the first sub-wirings R1 into a plurality of segments and extending in a direction consistent with the second direction Y.

It should be noted that in the embodiment, the various first sub-wirings R1 in the first touch electrode block 310 may be electrically insulated, compared with the dimension of the first touch electrode block 310 in the prior art, the first sub-wiring R1 is smaller, and the orthographic projections of adjacent first sub-wirings R1 on the base plate 100 form a plurality of second gaps J extending in a direction consistent the first direction X, which reduces the distance between the second gap J and an adjacent first gap T and increases corresponding line-shaped lights, so that the lights corresponding to the second gap J and an adjacent first gap T are denser, thereby reducing visible bright lines recognized by human eyes due to brightness changes. Similarly, the second touch electrode block 320 may be etched into a plurality of smaller second sub-wirings R2 through processes such as etching, and the orthographic projections of adjacent second sub-wirings R2 on base plate 100 form a plurality of second gaps J extending in a direction consistent the second direction Y. By forming the second gaps J, user experience is enhanced, and the display effect and performance of the display panel are improved.

Optionally, the first sub-wiring R1 may include a plurality of fifth sub-portions Z5 that are connected, and the second sub-wiring R2 may include a plurality of sixth sub-portions Z6 that are connected.

Optionally, the plurality of fifth sub-portions Z5 form a plurality of first hollow portions N1, the plurality of sixth sub-portions Z6 form a plurality of second hollow portions N2, the sixth sub-portion Z6 is located correspondingly to the first hollow portion N1, and the fifth sub-portion Z5 is located correspondingly to the second hollow portion N2.

In the embodiment, the orthographic projection of the fifth sub-portion Z5 on the film layer in which the second touch electrode block 320 is located does not overlap the sixth sub-portion Z6. For example, if the first touch electrode block 310 is disposed in the first conductive layer M1 and the second touch electrode block 320 is disposed in the second conductive layer M2, the orthographic projection of the fifth sub-portion Z5 on the second conductive layer M2 does not overlap the sixth sub-portion Z6, that is, the position on the second conductive layer M2 corresponding to the fifth sub-portion Z5 forms the second hollow portion N2. Similarly, the orthographic projection of the sixth sub-portion Z6 on the first conductive layer M1 does not overlap with the fifth sub-portion Z5, that is, the position on the second conductive layer M2 corresponding to the sixth sub-portion Z6 forms the first hollow portion N1, thereby reducing the capacitance between the fifth sub-portion Z5 and the sixth sub-portion Z6.

Referring to FIGS. 16 to 17, in some optional embodiments, to ensure consistent light-transmitting effect at the positions corresponding to the fifth sub-portions Z5 and the sixth sub-portions Z6, dummy electrode blocks may be disposed in both the first conductive layer M1 and the second conductive layer M2 to fill the empty space between adjacent fifth sub-portions Z5 and the empty space between adjacent sixth sub-portions Z6, thereby ensuring the light-transmitting effect.

Optionally, the touch layer 300 further includes dummy electrode blocks disposed in the same layer as the touch electrode blocks 301 and electrically insulated from the touch electrode blocks 301; and the second gaps J are formed between orthographic projections of at least a portion of the dummy electrode blocks on the base plate 100 and orthographic projections of adjacent touch electrode blocks 301 on the base plate 100, and/or the second gaps J are formed within the orthographic projections of at least a portion of the dummy electrode blocks on the base plate 100.

It may be understood that, the arrangement of a portion of the dummy electrode blocks is aimed to, on the one hand, reduce the capacitance between the touch electrode blocks, i.e., the dummy electrode block and the touch electrode block 301 are electrically insulated, and on the other hand, according to actual requirements, to from the second gaps J between the orthographic projections of a portion of the dummy electrode blocks on the base plate 100 and the orthographic projections of adjacent touch electrode blocks 301 on the base plate 100, thereby reducing visible bright lines.

According to the different dimensions and positions of the dummy electrode blocks, the second gaps J may also be formed within the dummy electrode blocks, that is, the second gaps J are formed within the orthographic projections of at least a portion of the dummy electrode blocks on the base plate 100, so as to cooperate with the second gaps J correspondingly formed within the touch electrode blocks 301 or with the first gaps T formed between the orthographic projections of adjacent touch electrode blocks 301 on base plate 100, thereby achieving that the distance between the second gap J formed between the orthographic projection of the dummy electrode block on the base plate 100 and the orthographic projection of an adjacent touch electrode block 301 on the base plate 100 and the adjacent first gap T is less than or equal to 200 μm, and/or the distance between any point on the second gap J formed between the orthographic projection of the dummy electrode block on the base plate 100 and the orthographic projection of an adjacent touch electrode block 301 on the base plate 100 and the second gap J correspondingly formed within the adjacent touch electrode block 301 is less than or equal to 200 μm.

Referring to FIGS. 16 to 17, in some optional embodiments, the dummy electrode blocks include first dummy electrode blocks P1 disposed in the same layer as the first touch electrode blocks 310 and electrically insulated from the first touch electrode blocks 310 and second dummy electrode blocks P2 disposed in the same layer as the second touch electrode blocks 320 and electrically insulated from the second touch electrode blocks 320, the first dummy electrode block P1 includes a first dummy sub-portion P11 located between adjacent fifth sub-portions Z5, and the second dummy electrode block P2 includes a second dummy sub-portion P21 located between adjacent sixth sub-portions Z6; and the second gap J is formed between an orthographic projection of the first dummy sub-portion P11 on the base plate 100 and orthographic projections of adjacent fifth sub-portions Z5 on the base plate 100, and the second gap J is formed between an orthographic projection of the second dummy sub-portion P21 on the base plate 100 and orthographic projections of adjacent sixth sub-portions Z6 on the base plate 100.

It may be understood that in the embodiment, the first dummy electrode block P1 and the first touch electrode block 310 are arranged adjacently in the same layer, and thus the second gap J may be formed between t the first dummy electrode block P1 and the first touch electrode block 310. Similarly, the second gap J is formed between the second dummy sub-portion P21 and the adjacent sixth sub-portions Z6, and the various first dummy electrode blocks P1 in the same layer may be electrically insulated to prevent connection with the first touch electrode block 310. The various second dummy electrode blocks P2 in the same layer may be electrically insulated to prevent connection with the second touch electrode block 320.

Optionally, the orthographic projections of the fifth sub-portions Z5 and the sixth sub-portions Z6 on the base plate 100 are all rectangular, the orthographic projections of the first dummy sub-portion P11 and the second dummy sub-portion P21 on the base plate 100 are all rectangular, and adjacent two sides of the rectangle may extend along the first direction X and the second direction Y, respectively. Optionally, the extension direction of a portion of the second gaps J formed between the orthographic projection of the first dummy sub-portion P11 on the base plate 100 and the orthographic projections of adjacent fifth sub-portions Z5 on the base plate 100 may be consistent with the first direction X, and the extension direction of a portion of the second gaps J may be consistent with the second direction Y, thereby reducing bright lines in the display panel along the first direction X and the second direction Y.

Similarly, the extension direction of a portion of the second gaps J formed between the orthographic projection of the second dummy sub-portion P21 on the base plate 100 and the orthographic projections of adjacent sixth sub-portions Z6 on the base plate 100 may be consistent with the first direction X, and the extension direction of a portion of the second gaps J may be consistent with the second direction Y.

Optionally, the orthographic projections of the fifth sub-portion Z5, the sixth sub-portion Z6, the first dummy sub-portion P11, and the second dummy sub-portion P21 on the base plate 100 are all the same to facilitate fabrication and enhance light transmittance.

In some optional embodiments, the second gap J between the orthographic projection of the first dummy sub-portion P11 on the base plate 100 and the orthographic projections of adjacent fifth sub-portions Z5 on the base plate 100 completely overlaps the second gap J between the orthographic projection of the second dummy sub-portion P21 on the base plate 100 and the orthographic projections of adjacent sixth sub-portions Z6 on the base plate 100.

Under a condition that the first dummy sub-portion P11 and the fifth sub-portion Z5 are located in the first conductive layer M1 and the second dummy sub-portion P21 and the sixth sub-portion Z6 are located in the second conductive layer M2, light emitted by the light-emitting unit may sequentially pass through the second gap J between the orthographic projection of the first dummy sub-portion P11 on the base plate 100 and the orthographic projections of adjacent fifth sub-portions Z5 on the base plate 100 and the second gap J between the orthographic projection of the second dummy sub-portion P21 on the base plate 100 and the orthographic projections of adjacent sixth sub-portions Z6 on the base plate 100, so as to avoid the light emitted by the light-emitting unit being blocked by the second dummy sub-portion P21 or the sixth sub-portion Z6 after passing through the second gap J between the orthographic projection of the first dummy sub-portion P11 on the base plate 100 and the orthographic projections of adjacent fifth sub-portions Z5 on the base plate 100, thereby ensuring the effectiveness of all the second gaps J.

Referring to FIGS. 5 to 6, in some optional embodiments, the display panel further includes an isolation structure 800 disposed at one side of the base plate 100 and forming a plurality of isolation openings, and at least a portion of the light-emitting unit is disposed within the isolation opening; and the orthographic projection of the electrode strip L on the base plate 100 at least partially overlaps the orthographic projection of the isolation structure 800 on the base plate 100.

It should be noted that to avoid shielding the light-emitting unit, the electrode strip L may be disposed above the isolation structure 800, that is, the orthographic projection of the electrode strip L on the base plate 100 at least partially overlaps the orthographic projection of the isolation structure 800 on the base plate 100, which ensures the light-emitting effect of the light-emitting unit.

In these optional embodiments, the isolation structure 800 includes a first sub-layer 810 and a second sub-layer 820 stacked in a direction away from the base plate 100. The second sub-layer 820 protrudes towards the isolation opening relative to the first sub-layer 810, thereby forming a recess under the second sub-layer 820. During the fabrication of the light-emitting units, the light-emitting material may be fractured at the edges of the second sub-layer 820 to form independent light-emitting units.

In the embodiment, the light-transmitting opening may extend through the first sub-layer 810 and the second sub-layer 820 to prevent the first sub-layer 810 and the second sub-layer 820 from blocking light, in which the light may refer to light emitted from optical components under the display panel, such as cameras or infrared light-emitting elements, or light originating from external sources.

Optionally, the isolation structure 800 further includes a third sub-layer located at the side of the first sub-layer 810 towards the base plate 100 and protruding towards the isolation opening relative to the first sub-layer 810. During the fabrication of the isolation structure 800, the third sub-layer may protect the film layers located at the side corresponding to the base plate 100 when the first sub-layer 810 undergoes side etching.

Referring to FIGS. 2 and 24 to 27, the embodiments of present application further provide a display panel, including: a base plate 100; an isolation structure 800 disposed at one side of the base plate 100 and forming a plurality of isolation openings; a light-emitting layer 200 disposed at one side of the base plate 100 and including light-emitting units, at least a portion of the light-emitting unit being disposed within the isolation opening; and a touch layer 300 disposed at a side of the light-emitting layer 200 away from the base plate 100 and including a plurality of touch electrode blocks 301 that are spaced apart and electrically insulated along both a first direction X and a second direction Y, the touch electrode block 301 including a mesh structure consisting of a plurality of electrode strips L, an orthographic projection of the electrode strip L on the base plate 100 at least partially overlapping an orthographic projection of the isolation structure 800 on the base plate 100, along the first direction X, a first gap T being formed between orthographic projections of adjacent touch electrode blocks 301 on the base plate 100, and along the second direction Y, a first gap T being formed between orthographic projections of adjacent touch electrode blocks 301 on the base plate 100, the first direction X intersecting the second direction Y; at least one second gap J being formed in an orthographic projection of the touch electrode block 301 located between, with respect to orthographic projections on the base plate 100, adjacent and side-by-side first gaps T on the base plate 100, a distance d1 between any point on the second gap J and an adjacent first gap T being less than or equal to 200 μm, and/or a distance d2 between any point on the second gap J and an adjacent second gap J being less than or equal to 200 μm.

The display panel according to the embodiments of the present application includes the base plate 100, the light-emitting layer 200, and the touch layer 300. In the embodiment, the display panel has a self-capacitive touch structure, in which the various touch electrode blocks 301 are electrically insulated and transmit touch signals independently. Along the first direction X, the first gap T is formed between orthographic projections of adjacent touch electrode blocks 301 on the base plate 100, and the extension trajectory of the first gap T is consistent with the extension direction of the corresponding edge of the touch electrode block 301, that is, the first gap T is formed between the edges of the orthographic projections of the touch electrode blocks 301 adjacent along the first direction X on the base plate 100. Similarly, along the second direction Y, the extension direction of the first gap T formed between orthographic projections of adjacent touch electrode blocks 301 on the base plate 100 is consistent with the extension direction of the opposite edges of the orthographic projections of the touch electrode blocks 301 adjacent along the second direction Y on the base plate 100. The embodiments of the present application limit the distance d1 between any point on the second gap J and a correspondingly adjacent first gap T to be less than or equal to 200 μm, and/or the distance d2 between any point on the second gap J and an adjacent second gap J to be less than or equal to 200 μm, so as to increase the overall arrangement density of the second gaps J and the first gaps T. The inventors have found that, due to the recognition limitation of human eyes, under a condition that the distance d1 between any point on the second gap J and an adjacent first gap T is less than or equal to 200 μm, and/or the distance d2 between any point on the second gap J and an adjacent second gap J is less than or equal to 200 μm, the distances between the line-shaped lights generated by the second gaps J or the first gaps T are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

It should be noted that the specific structure of the touch electrode block 301 in the embodiment is also shown as FIG. 4 and includes a mesh structure consisting of a plurality of electrode strips L, within the touch electrode block 301, orthographic projections of endpoints of a portion of the electrode strips L on the base plate 100 are spaced apart to form the first dot-shaped gaps J10, and a plurality of first dot-shaped gaps J10 are spaced apart to form the first sub-gap J1 and the second sub-gap J2. The orthographic projections of endpoints of a portion of the electrode strips L between adjacent touch electrode blocks 301 on the base plate 100 are spaced apart to form the second dot-shaped gaps T10, and adjacent second dot-shaped gaps T10 are arranged to form the first gap T.

Referring to FIG. 24, in some optional embodiments, orthographic projections of the first gaps T, within the orthographic projection of the touch electrode block 301 on the base plate 100, on the base plate 100 are arranged as concentric rings.

It may be understood that since the first gap T needs to intersect at least one electrode strip L, the orthographic projection of the first gap T, within the orthographic projection of the touch electrode block 301 on the base plate

100, on the base plate 100 may be arranged as a non-closed ring structure, and the unbroken electrode strip L is located at the opening of the ring structure.

Optionally, the shape of the concentric rings of the orthographic projections of the first gaps T, within the orthographic projection of the touch electrode block 301 on the base plate 100, on the base plate 100 is consistent with the shape of the orthographic projection of the touch electrode block 301 on the base plate 100 and/or the extension direction of the first gap T formed between the orthographic projections of adjacent touch electrode blocks 301 on the base plate 100.

For example, if the orthographic projection of the touch electrode block 301 on the base plate 100 is rectangular, the orthographic projections of the second gaps J, within the orthographic projection of the touch electrode block 301 on the base plate 100, on the base plate 100 may be arranged as rectangular concentric rings, and the various sides of the corresponding rectangular ring are consistent with the extension direction of the first gap T formed between the orthographic projections of the corresponding adjacent touch electrode blocks 301 on the base plate 100.

Referring to FIGS. 24 to 27, optionally, within an orthographic projection of a single touch electrode block 301 on the base plate 100, the second gaps J include a plurality of first sub-gaps J1 arranged side-by-side and a plurality of second sub-gaps J2 arranged side-by-side; and an extension direction of the first sub-gap J1 is consistent with an extension direction of the first gap T between the touch electrode blocks 301 adjacent along the first direction X, an extension direction of the second sub-gap J2 is consistent with an extension direction of the first gap T between the touch electrode blocks 301 adjacent along the second direction Y, and the first sub-gap J1 intersects the second sub-gap J2.

It may be understood that in the embodiment, both the first sub-gap J1 and the second sub-gap J2 may be correspondingly arranged within a single touch electrode block 301, and the first sub-gap J1 intersects the second sub-gap J2, so as to reduce the distance between the first sub-gap J1 and the first gap T between the touch electrode blocks 301 adjacent along the first direction X, and the distance between the second sub-gap J2 and the first gap T between the touch electrode blocks 301 adjacent along the second direction Y.

Referring to FIG. 2, optionally, a plurality of first sub-gaps J1 intersect a plurality of second sub-gaps J2, respectively, to form rectangular or rhombic areas, and the like, that is, a plurality of first sub-gaps J1 and a plurality of second sub-gaps J2 form a mesh pattern.

Referring to FIG. 25 or 27, alternatively, the first sub-gap J1 and the second sub-gap J2 may be connected end-to-end, that is, the first end of a first sub-gap J1 may be connected with one end of a second sub-gap J2, the other end of the second sub-gap J2 may be connected with the second end of another first sub-gap J1, and such connection pattern repeats to form a second gap J which is snake-shaped or bow-shaped.

Optionally, the extension trajectory of the first sub-gap J1 and the second sub-gap J2 may be one of a straight line, a bend line, and a wavy line, and should be specifically selected according to the position of the first dot-shaped gap J10. If the extension trajectory of the first sub-gap J1 and the second sub-gap J2 is a bend line, the corresponding extension direction refers to the overall extension direction of the entire first sub-gap J1 and the entire second sub-gap J2, not the extension direction of any specific segment of the bend line. Similarly, if the extension trajectory of the first sub-gap J1 and the second sub-gap J2 is a wavy line, the corresponding extension direction refers to the overall extension direction of the entire first sub-gap J1 and the entire second sub-gap J2, not the extension direction of any specific segment of the wavy line.

Referring to FIGS. 5 to 6, in some optional embodiments, the display panel further includes an isolation structure 800 disposed at one side of the base plate 100 and forming a plurality of isolation openings, and at least a portion of the light-emitting unit is disposed within the isolation opening; and the orthographic projection of the electrode strip L on the base plate 100 at least partially overlaps the orthographic projection of the isolation structure 800 on the base plate 100.

It should be noted that to avoid shielding the light-emitting unit, the electrode strip L may be disposed above the isolation structure 800, that is, the orthographic projection of the electrode strip L on the base plate 100 at least partially overlaps the orthographic projection of the isolation structure 800 on the base plate 100, which ensures the light-emitting effect of the light-emitting unit.

In these optional embodiments, the isolation structure 800 includes a first sub-layer 810 and a second sub-layer 820 stacked in a direction away from the base plate 100. The second sub-layer 820 protrudes towards the isolation opening relative to the first sub-layer 810, thereby forming a recess under the second sub-layer 820. During the fabrication of the light-emitting units, the light-emitting material may be fractured at the edges of the second sub-layer 820 to form independent light-emitting units.

In the embodiment, the light-transmitting opening may extend through the first sub-layer 810 and the second sub-layer 820 to prevent the first sub-layer 810 and the second sub-layer 820 from blocking light, in which the light may refer to light emitted from optical components under the display panel, such as cameras or infrared light-emitting elements, or light originating from external sources.

Optionally, the isolation structure 800 further includes a third sub-layer located at the side of the first sub-layer 810 towards the base plate 100 and protruding towards the isolation opening relative to the first sub-layer 810. During the fabrication of the isolation structure 800, the third sub-layer may protect the film layers located at the side corresponding to the base plate 100 when the first sub-layer 810 undergoes side etching.

Figure 28:
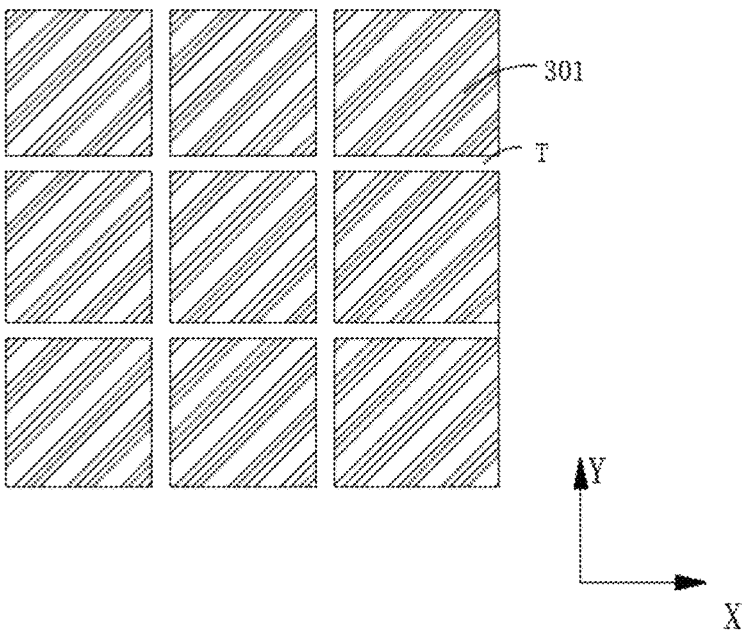
FIG. 28 shows a schematic structural diagram of a touch layer in a display panel according to yet another embodiment of the present application.
Figure 29:
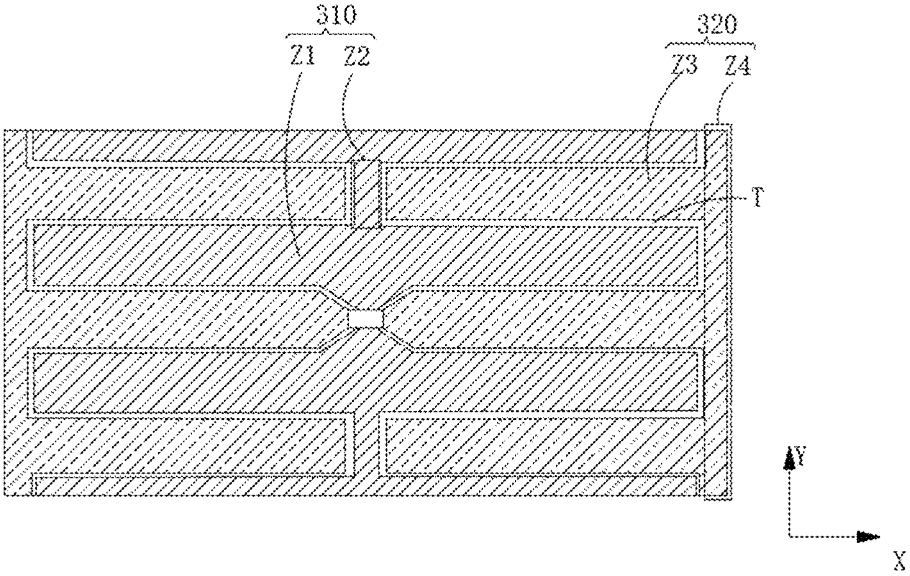
FIG. 29 shows a schematic structural diagram of a touch layer in a display panel according to yet another embodiment of the present application.

Referring to FIGS. 5 to 6 and 28, the embodiments of present application further provide a display panel, including: a base plate 100; an isolation structure 800 disposed at one side of the base plate 100 and forming a plurality of isolation openings; a light-emitting layer 200 disposed at one side of the base plate 100 and including light-emitting units, at least a portion of the light-emitting unit being disposed within the isolation opening; and a touch layer 300 disposed at a side of the light-emitting layer 200 away from the base plate 100 and including a plurality of touch electrode blocks 301, the touch electrode block 301 including a mesh structure consisting of a plurality of electrode strips L, an orthographic projection of the electrode strip L on the base plate 100 at least partially overlapping an orthographic projection of the isolation structure 800 on the base plate 100, two or more side-by-side first gaps T of a line shape being formed between orthographic projections of a group of adjacent touch electrode blocks 301 on the base plate 100, and a distance between any point on at least a portion of the first gaps T and a correspondingly adjacent first gap T being less than or equal to 200 μm.

The display panel according to the embodiments of the present application includes the base plate 100, the light-emitting layer 200, and the touch layer 300. In the embodiment, the dimension of each of the touch electrode blocks 301 may be adjusted, i.e., reduced, so that the correspondingly formed distance between any point on the first gap T and a correspondingly adjacent first gap T is less than or equal to 200 μm, thereby increasing the arrangement density of the first gaps T. The inventors have found that, due to the recognition limitation of human eyes, under a condition that the distance between any point on the first gap T and a correspondingly adjacent first gap T is less than or equal to 200 μm, the distances between the line-shaped lights generated by the first gaps T are sufficiently small, and human eyes cannot recognize the bright lines and dark areas between the bright lines, and thus human eyes recognize a continuous bright area, thereby avoiding human eyes to recognize the bright lines, enhancing user experience, and improving the display effect and performance of the display panel.

In some optional embodiments, the first touch electrode block 310 includes first sub-portions Z1 and second sub-portions Z2 that are connected, the second touch electrode block 320 includes third sub-portions Z3 and fourth sub-portions Z4 that are connected, the first sub-portion Z1 and the third sub-portion Z3 extend along the first direction X, the second sub-portion Z2 and the fourth sub-portion Z4 extend along the second direction Y, the first sub-portions Z1 are spaced apart along the second direction Y, the second sub-portion Z2 is located between the first sub-portions Z1 adjacent along the second direction Y, the third sub-portions Z3 are spaced apart along the second direction Y, the fourth sub-portion Z4 is located between the third sub-portions Z3 adjacent along the second direction Y, and along the second direction Y, the fourth sub-portion Z4 is disposed between adjacent first sub-portions Z1, the second sub-portion Z2 is disposed between adjacent third sub-portions Z3; along the second direction Y, the widths of the first sub-portion Z1 and the third sub-portion Z3 are less than or equal to 200 μm, that is, the dimensions of the first sub-portion Z1 and the third sub-portion Z3 may be reduced, so that the distance between the adjacent first gaps T extending along the first direction formed correspondingly to the first sub-portion Z1 and the third sub-portion Z3 is less than or equal to 200 μm, thereby avoiding human eyes to recognize the bright lines, enhancing user experience, and improving the display effect and performance of the display panel.

In some optional embodiments, the first touch electrode block 310 includes first sub-portions Z1 and second sub-portions Z2 that are connected, the second touch electrode block 320 includes third sub-portions Z3 and fourth sub-portions Z4 that are connected, the first sub-portion Z1 and the third sub-portion Z3 extend along the first direction X, the second sub-portion Z2 and the fourth sub-portion Z4 extend along the second direction Y, the first sub-portions Z1 are spaced apart along the second direction Y, the second sub-portion Z2 is located between the first sub-portions Z1 adjacent along the second direction Y, the third sub-portions Z3 are spaced apart along the second direction Y, the fourth sub-portion Z4 is located between the third sub-portions Z3 adjacent along the second direction Y, and along the second direction Y, the fourth sub-portion Z4 is disposed between adjacent first sub-portions Z1, the second sub-portion Z2 is disposed between adjacent third sub-portions Z3; along the first direction X, the widths of the second sub-portion Z2 and the fourth sub-portion Z4 are less than or equal to 200 μm, that is, the dimensions of the second sub-portion Z2 and the fourth sub-portion Z4 may be limited, so that the distance between the adjacent first gaps T extending along the first direction formed correspondingly to the second sub-portion Z2 and the fourth sub-portion Z4 is less than or equal to 200 μm, thereby avoiding human eyes to recognize the bright lines, enhancing user experience, and improving the display effect and performance of the display panel.

In the embodiment, according to actual requirements, only the dimensions of the first sub-portion Z1 and the third sub-portion Z3 may be limited to satisfy the above requirements, or only the dimensions of the second sub-portion Z2 and the fourth sub-portion Z4 may be limited to satisfy the above requirements, or all the dimensions of the first sub-portion Z1, the third sub-portion Z3, the second sub-portion Z2, and the fourth sub-portion Z4 may be limited to satisfy the above requirements, which may be specifically configured according to the particular shape of the touch electrode block 301. For example, it may be further limited that along the first direction X, the lengths of the first sub-portion Z1 and the third sub-portion Z3 are less than or equal to 200 μm, and/or along the second direction Y, the widths of the second sub-portion Z2 and the fourth sub-portion Z4 are less than or equal to 200 μm.

In some optional embodiments, each of the touch electrode blocks 301 includes a mesh structure consisting of a plurality of electrode strips L, orthographic projections of endpoints of a portion of the electrode strips L between adjacent touch electrode blocks 301 on the base plate 100 are spaced apart to form second dot-shaped gaps T10, and adjacent second dot-shaped gaps T10 are arranged to form the first gap T.

It may be understood that in the embodiment, the first gap T is formed between a portion of the electrode strips L between adjacent touch electrode blocks 301, and since the touch electrode blocks 301 generally should be electrically insulated, the first gap T does not intersect the electrode strip L, that is, adjacent touch electrode blocks 301 will not be electrically connected through the electrode strips L.

In some optional embodiments, the display panel further includes an isolation structure 800 disposed at one side of the base plate 100 and forming a plurality of isolation openings, and at least a portion of the light-emitting unit is disposed within the isolation opening; and the orthographic projection of the electrode strip L on the base plate 100 at least partially overlaps the orthographic projection of the isolation structure 800 on the base plate 100.

It should be noted that to avoid shielding the light-emitting unit, the electrode strip L may be disposed above the isolation structure 800, that is, the orthographic projection of the electrode strip L on the base plate 100 at least partially overlaps the orthographic projection of the isolation structure 800 on the base plate 100, which ensures the light-emitting effect of the light-emitting unit.

In these optional embodiments, the isolation structure 800 includes a first sub-layer 810 and a second sub-layer 820 stacked in a direction away from the base plate 100. The second sub-layer 820 protrudes towards the isolation opening relative to the first sub-layer 810, thereby forming a recess under the second sub-layer 820. During the fabrication of the light-emitting units, the light-emitting material may be fractured at the edges of the second sub-layer 820 to form independent light-emitting units.

The embodiments of the present application further provide a display apparatus including the display panel as described in any of the above embodiments.

Since the display apparatus according to the embodiments of the present application includes the display panel of any of the above embodiments, the display apparatus according to the embodiments of the present application has the beneficial effects of the display panel of any of the above embodiments, which will not be repeated herein.

The display panel according to the embodiments of the present application may be an organic light-emitting diode (OLED) display panel, a quantum dot light-emitting diode (QLED) display panel, or a micro flat display panel (Micro-OLED or Micro-LED), and the like.

The display apparatus according to the embodiments of the present application includes, but is not limited to, devices with display function such as mobile phones, personal digital assistants (PDA), tablet computers, e-books, televisions, access control systems, smart landline phones, and consoles.

The foregoing describes only some specific embodiments of the present application, and those skilled in the art can readily understand that, for ease and brevity of description, the specific operation processes of a system, module, and unit as described above may refer to the corresponding processes of the aforementioned method embodiments, and are not repeated herein. It should be understood that the scope of protection of the present application is not limited to the above, any skilled in the art can readily make various equivalent modifications or replacements within the scope of the present application, and such modifications or replacements should be encompassed within the scope of protection of the present application.

It should be further noted that the exemplary embodiments described herein illustrate some methods or systems based on a series of steps or apparatus. However, the present application is not limited to the sequence of steps described above, that is, the steps may be performed in the order described in the embodiments or in a different order from the embodiments, or a plurality of steps may be performed simultaneously.

What is claimed is:

1. A display panel, comprising:

a base plate;

a light-emitting layer disposed at one side of the base plate and comprising light-emitting units; and a touch layer disposed at a side of the light-emitting layer away from the base plate and comprising a plurality of touch electrode blocks, first gaps of a line shape being formed between orthographic projections of a group of adjacent touch electrode blocks on the base plate, at least one second gap being formed within an orthographic projection of the touch electrode block located between adjacent and side-by-side first gaps on the base plate, a distance between any point on the second gap and a correspondingly adjacent first gap being less than or equal to 200 μm, or a distance between any point on the second gap and an adjacent second gap being less than or equal to 200 μm;

wherein the first gaps comprise a third sub-gap extending along a first direction and a fourth sub-gap extending along a second direction, the second gaps comprise a first sub-gap corresponding to the third sub-gap and a second sub-gap corresponding to the fourth sub-gap, and the first direction intersects the second direction; an extension direction of the first sub-gap is consistent with an extension direction of the third sub-gap, and an extension direction of the second sub-gap is consistent with an extension direction of the fourth sub-gap.

2. The display panel of claim 1, wherein an extension direction of the second gap is consistent with an extension direction of an adjacent first gap.

3. The display panel of claim 1, wherein the second gap comprises a plurality of first dot-shaped gaps being spaced apart; and the touch electrode block comprises a mesh structure consisting of a plurality of electrode strips, within the touch electrode block, orthographic projections of endpoints of a portion of the electrode strips on the base plate are spaced apart to form the first dot-shaped gaps, and a plurality of first dot-shaped gaps are spaced apart to form the second gap;

wherein the electrode strips form a plurality of mesh units, and a shape of an orthographic projection of the mesh unit on the base plate matches a shape of an orthographic projection of the light-emitting unit on the base plate.

4. The display panel of claim 3, wherein one of the second gaps intersects one or more of the electrode strips.

5. The display panel of claim 3, wherein each of the touch electrode blocks comprises a mesh structure consisting of a plurality of electrode strips, orthographic projections of endpoints of a portion of the electrode strips between adjacent touch electrode blocks on the base plate are spaced apart to form second dot-shaped gaps, and adjacent second dot-shaped gaps are arranged to form the first gap.

6. The display panel of claim 3, wherein the display panel further comprises an isolation structure disposed at one side of the base plate and forming a plurality of isolation openings, and at least a portion of the light-emitting unit is disposed within the isolation opening; and an orthographic projection of the electrode strip on the base plate at least partially overlaps an orthographic projection of the isolation structure on the base plate.

7. The display panel of claim 1, wherein along a direction away from a plane in which the base plate is located, the touch layer comprises a first conductive layer, a first insulating layer, and a second conductive layer being stacked;

the touch electrode blocks comprise a plurality of first touch electrode blocks and a plurality of second touch electrode blocks, one of the first touch electrode block and the second touch electrode block is located in the first conductive layer, and the other is located in the second conductive layer;

the plurality of first touch electrode blocks extend along a first direction and are spaced apart along a second direction, the plurality of second touch electrode blocks extend along the second direction and are spaced apart along the first direction, and the first direction intersects the second direction; and the first gaps are formed between orthographic projections of the first touch electrode blocks on the base plate and orthographic projections of the second touch electrode blocks on the base plate.

8. The display panel of claim 7, wherein the first touch electrode block comprises at least one first sub-gap extending in a direction consistent with the first direction, and the second touch electrode block comprises at least one second sub-gap extending in a direction consistent with the second direction; and at an overlapping position between the first touch electrode block and the second touch electrode block, the first touch electrode block comprises the first sub-gap corresponding to the second sub-gap on the second touch electrode block, and the second touch electrode block comprises the second sub-gap corresponding to the first sub-gap on the first touch electrode block.

9. The display panel of claim 7, wherein the first touch electrode block comprises two or more first sub-wirings spaced apart along the second direction, the second touch electrode block comprises two or more second sub-wirings spaced apart along the first direction, orthographic projections of adjacent first sub-wirings on the base plate form the second gap separated by the second sub-wirings into a plurality of segments and extending in a direction consistent with the first direction, and orthographic projections of adjacent second sub-wirings on the base plate form the second gap separated by the first sub-wirings into a plurality of segments and extending in a direction consistent with the second direction.

10. The display panel of claim 7, wherein the first touch electrode block comprises a plurality of fifth sub-portions spaced apart along both the first direction and the second direction and connected through first connecting portions, and the second touch electrode block comprises a plurality of sixth sub-portions spaced apart along both the first direction and the second direction and connected through second connecting portions;

the second gaps are formed between orthographic projections of the fifth sub-portions on the base plate and orthographic projections of the sixth sub-portions on the base plate; and the plurality of fifth sub-portions form a plurality of first hollow portions, the plurality of sixth sub-portions form a plurality of second hollow portions, the sixth sub-portion is located correspondingly to the first hollow portion, and the fifth sub-portion is located correspondingly to the second hollow portion;

wherein the touch layer further comprises dummy electrode blocks disposed in the same layer as the touch electrode blocks and electrically insulated from the touch electrode blocks; and the second gaps are formed between orthographic projections of at least a portion of the dummy electrode blocks on the base plate and orthographic projections of adjacent touch electrode blocks on the base plate, or the second gaps are formed within the orthographic projections of at least a portion of the dummy electrode blocks on the base plate.

11. The display panel of claim 10, wherein the dummy electrode blocks comprise first dummy electrode blocks disposed in the same layer as the first touch electrode blocks and electrically insulated from the first touch electrode blocks and second dummy electrode blocks disposed in the same layer as the second touch electrode blocks and electrically insulated from the second touch electrode blocks, the first dummy electrode block comprises a first dummy sub-portion located between adjacent fifth sub-portions, and the second dummy electrode block comprises a second dummy sub-portion located between adjacent sixth sub-portions; and the second gap is formed between an orthographic projection of the first dummy sub-portion on the base plate and orthographic projections of adjacent fifth sub-portions on the base plate, and the second gap is formed between an orthographic projection of the second dummy sub-portion on the base plate and orthographic projections of adjacent sixth sub-portions on the base plate;

wherein the second gap between the orthographic projection of the first dummy sub-portion on the base plate and the orthographic projections of adjacent fifth sub-portions on the base plate completely overlaps the second gap between the orthographic projection of the second dummy sub-portion on the base plate and the orthographic projections of adjacent sixth sub-portions on the base plate.

12. The display panel of claim 11, wherein along the direction away from the plane in which the base plate is located, the touch layer comprises the first conductive layer, the first insulating layer, and the second conductive layer being stacked;

the touch electrode blocks comprise a plurality of first touch electrode blocks and a plurality of second touch electrode blocks, the plurality of first touch electrode blocks are electrically connected along the first direction to form first touch wirings, the plurality of second touch electrode blocks are electrically connected along the second direction to form second touch wirings, the first touch wirings are spaced apart along the second direction, the second touch wirings are spaced apart along the first direction, the first touch electrode block and the second touch electrode block are located in a same one of the first conductive layer and the second conductive layer, and the first direction intersects the second direction; the first touch electrode block and the second touch electrode block are both located in the second conductive layer, and the first gaps are formed between orthographic projections of the first touch electrode blocks and the second touch electrode blocks on the base plate; and the touch layer further comprises a bridging portion disposed in the first conductive layer, along the first direction, adjacent two first touch electrode blocks are electrically connected through the bridging portion and a via located in the first insulating layer; or along the second direction, adjacent two first touch electrode blocks are electrically connected through the bridging portion and a via located in the first insulating layer.

13. The display panel of claim 12, wherein the first touch electrode block comprises first sub-portions and second sub-portions being connected, the second touch electrode block comprises third sub-portions and fourth sub-portions being connected, the first sub-portion and the third sub-portion extend along the first direction, the second sub-portion and the fourth sub-portion extend along the second direction, the first sub-portions are spaced apart along the second direction, the second sub-portion is located between the first sub-portions adjacent along the second direction, the third sub-portions are spaced apart along the second direction, the fourth sub-portion is located between the third sub-portions adjacent along the second direction, and along the second direction, the fourth sub-portion is disposed between adjacent first sub-portions, the second sub-portion is disposed between adjacent third sub-portions;

the first gap extending along the first direction is formed between orthographic projections of the first sub-portion and the third sub-portion on the base plate, the first gap extending along the second direction is formed between orthographic projections of the first sub-portion and the fourth sub-portion on the base plate, and the first gap extending along the second direction is formed between orthographic projections of the third sub-portion and the second sub-portion on the base plate; and the first sub-gap extending in a direction consistent with the first direction is formed within an orthographic projection of at least one of the first sub-portion, the second sub-portion, the third sub-portion, and the fourth sub-portion on the base plate; or a second sub-gap extending in a direction consistent with the second direction is formed within an orthographic projection of at least one of the first sub-portion, the second sub-portion, the third sub-portion, and the fourth sub-portion on the base plate.

14. The display panel of claim 12, wherein the orthographic projections of the first touch electrode block and the second touch electrode block on the base plate are both rhombus shaped;

the rhombus comprises a first side and a second side that are connected;

the first gaps comprise a fifth sub-gap extending in a direction consistent with an extension direction of the first side, and a sixth sub-gap extending in a direction consistent with an extension direction of the second side;

the second gap extending in a direction consistent with an extension direction of one of the fifth sub-gap and the sixth sub-gap is formed within each of the orthographic projections of the first touch electrode block and the second touch electrode block on the base plate; and extension directions of the second gaps within the orthographic projections of the first touch electrode block and the second touch electrode block on the base plate are consistent with each other.

15. The display panel of claim 11, wherein the touch layer comprises a plurality of touch electrode blocks being spaced apart and electrically insulated along both the first direction and the second direction, along the first direction, the first gap is formed between orthographic projections of adjacent touch electrode blocks on the base plate, and along the second direction, the first gap is formed between orthographic projections of adjacent touch electrode blocks on the base plate;

wherein the second gap is formed within an orthographic projection of the touch electrode block on the base plate, and an extension direction of the second gap is consistent with an extension direction of the first gap between the touch electrode blocks adjacent along the first direction; or the extension direction of the second gap is consistent with an extension direction of the first gap between the touch electrode blocks adjacent along the second direction.

16. The display panel of claim 15, wherein orthographic projections of the second gaps, within the orthographic projection of the touch electrode block on the base plate, on the base plate are arranged as concentric rings.

17. The display panel of claim 15, wherein within an orthographic projection of a single touch electrode block on the base plate, the second gaps comprise a plurality of first sub-gaps arranged side-by-side and a plurality of second sub-gaps arranged side-by-side; and an extension direction of the first sub-gap is consistent with an extension direction of the first gap between the touch electrode blocks adjacent along the first direction, an extension direction of the second sub-gap is consistent with an extension direction of the first gap between the touch electrode blocks adjacent along the second direction, and the first sub-gap intersects the second sub-gap; and the first sub-gap and the second sub-gap are connected end-to-end.

18. A display panel, comprising:

a base plate;

a light-emitting layer disposed at one side of the base plate and comprising light-emitting units; and a touch layer disposed at a side of the light-emitting layer away from the base plate and comprising a plurality of touch electrode blocks, along a direction away from a plane in which the base plate is located, the touch layer comprising a first conductive layer, a first insulating layer, and a second conductive layer being stacked, the touch electrode blocks comprising a plurality of first touch electrode blocks and a plurality of second touch electrode blocks, one of the first touch electrode block and the second touch electrode block being located in the first conductive layer, and the other being located in the second conductive layer, the plurality of first touch electrode blocks extending along a first direction and being spaced apart along a second direction, the plurality of second touch electrode blocks extending along the second direction and being spaced apart along the first direction, and the first direction intersecting the second direction;

the first touch electrode block comprising a plurality of fifth sub-portions spaced apart along both the first direction and the second direction and connected through first connecting portions, and the second touch electrode block comprising a plurality of sixth sub-portions spaced apart along both the first direction and the second direction and connected through second connecting portions;

second gaps being formed between orthographic projections of the fifth sub-portions on the base plate and orthographic projections of the sixth sub-portions on the base plate, first gaps being formed between orthographic projections of the first touch electrode blocks and the second touch electrode blocks on the base plate, a distance between any point on the second gap and an adjacent first gap being less than or equal to 200 μm, or a distance between any point on the second gap and an adjacent second gap being less than or equal to 200 μm.

19. A display panel, comprising:

a base plate;

an isolation structure disposed at one side of the base plate and forming a plurality of isolation openings;

a light-emitting layer disposed at one side of the base plate and comprising light-emitting units, at least a portion of the light-emitting unit being disposed within the isolation opening and a touch layer disposed at a side of the light-emitting layer away from the base plate and comprising a plurality of touch electrode blocks that are spaced apart and electrically insulated along both a first direction and a second direction, the touch electrode block comprising a plurality of electrode strips, an orthographic projection of the electrode strip on the base plate at least partially overlapping an orthographic projection of the isolation structure on the base plate, first gaps being formed along both the first direction and the second direction between orthographic projections of adjacent touch electrode blocks on the base plate, and the first direction intersecting the second direction;

one or more second gaps being formed along both the first direction and the second direction in an orthographic projection of the touch electrode block located between, with respect to orthographic projections on the base plate, adjacent and side-by-side first gaps on the base plate, a distance between any point on the second gap and an adjacent first gap being less than or equal to 200 μm, or a distance between any point on the second gap and an adjacent second gap being less than or equal to 200 μm;

wherein the first gaps comprise a third sub-gap extending along a first direction and a fourth sub-gap extending along a second direction, the second gaps comprise a first sub-gap corresponding to the third sub-gap and a second sub-gap corresponding to the fourth sub-gap, and the first direction intersects the second direction; an extension direction of the first sub-gap is consistent with an extension direction of the third sub-gap, and an extension direction of the second sub-gap is consistent with an extension direction of the fourth sub-gap.

* * * * *